US012744838B2

(12) United States Patent
Yang et al.

(10) Patent No.: US 12,744,838 B2
(45) Date of Patent: Sep. 22, 2026

(54) MULTI-LINK-BASED COMMUNICATION METHOD AND APPARATUS

(71) Applicant: Huawei Technologies Co., Ltd., Shenzhen (CN)

(72) Inventors: Mao Yang, Xi'an (CN); Zhongjiang Yan, Xi'an (CN); Yunbo Li, Shenzhen (CN); Yiqing Li, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/980,612

(22) Filed: Dec. 13, 2024

(65) Prior Publication Data

US 2025/0112979 A1 Apr. 3, 2025

Related U.S. Application Data

(63) Continuation of application No. PCT/CN2023/098930, filed on Jun. 7, 2023.

(30) Foreign Application Priority Data

Jun. 16, 2022 (CN) ......................... 202210689577.2

(51) Int. Cl.
*G06F 15/16* (2006.01)
*G06F 9/54* (2006.01)
(Continued)

(52) U.S. Cl.
CPC .............. *H04L 69/14* (2013.01); *H04L 69/16* (2013.01)

(58) Field of Classification Search
CPC ......... H04L 69/14; H04L 69/16; H04L 69/28; H04W 76/15; H04W 76/27; H04W 84/12; H04W 76/20
(Continued)

(56) References Cited

U.S. PATENT DOCUMENTS

2015/0215867 A1* 7/2015 Choi ................. H04W 52/0216 370/311
2022/0029736 A1* 1/2022 Chu ...................... H04L 1/0025
(Continued)

FOREIGN PATENT DOCUMENTS

DE 102021134341 A1 * 8/2022 .......... H04W 74/006
EP 1358770 B1 * 4/2012 ............. H04L 67/00
(Continued)

OTHER PUBLICATIONS 802.11ac, IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 4: Enhancements for Very High Throughput for Operation in Bands below 6 GHz, IEEE Computer Society, Dec. 11, 2013, total 425 pages.
(Continued)

*Primary Examiner* — Hamza N Algibhah
(74) *Attorney, Agent, or Firm* — Conley Rose, P.C.

(57) ABSTRACT

A multi-link-based communication method is applied to a wireless local area network system that supports a next-generation WI-FI protocol of IEEE 802.11ax, for example, 802.11 series protocols such as 802.11be, WI-FI 7, or EHT, and a next-generation protocol of 802.11be, WI-FI 8, or WI-FI AI, and may be applied to a UWB-based wireless personal local area network system and a sensing system. A related condition of a group addressed frame other than a trigger frame, a multi-station block acknowledgment frame, and a no-data PPDU announcement frame is added to a condition set, so that a non-AP STA can determine, based on information about the group addressed frame when performing a switching operation, whether to switch to a listening operation mode.

20 Claims, 7 Drawing Sheets

(51) Int. Cl.
*H04L 29/06* (2006.01)
*H04L 69/14* (2022.01)
*H04L 69/16* (2022.01)

(58) Field of Classification Search
USPC .......................................................... 709/223
See application file for complete search history.

(56) References Cited

U.S. PATENT DOCUMENTS

| | | | | |
|---|---|---|---|---|
| 2022/0046621 | A1* | 2/2022 | Kandala | H04B 7/0697 |
| 2022/0104261 | A1* | 3/2022 | Kwon | H04W 48/16 |
| 2022/0182184 | A1* | 6/2022 | Wang | H04L 1/1621 |
| 2022/0294583 | A1* | 9/2022 | Lu | H04W 76/15 |
| 2022/0312330 | A1* | 9/2022 | Chakraborty | H04W 52/0245 |
| 2023/0144291 | A1* | 5/2023 | Naik | H04W 74/0816 370/329 |
| 2023/0171700 | A1* | 6/2023 | Kondabattini | H04W 52/0219 370/311 |
| 2023/0354383 | A1* | 11/2023 | Chen | H04L 5/0037 |
| 2024/0147301 | A1* | 5/2024 | Kuo | H04W 28/0252 |
| 2025/0016550 | A1* | 1/2025 | Li | H04W 8/005 |

FOREIGN PATENT DOCUMENTS

| | | | | | |
|---|---|---|---|---|---|
| JP | 2013502850 | A | * | 1/2013 | H04W 88/06 |
| JP | 2026031986 | A | * | 2/2026 | |
| VN | 10055474 | B | * | 1/2026 | |
| WO | WO-2022228400 | A1 | * | 11/2022 | H04W 74/0808 |
| WO | WO-2023206579 | A1 | * | 11/2023 | H04W 74/0808 |

OTHER PUBLICATIONS 802.11ax, IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications Amendment 1: Enhancements for High-Efficiency WLAN, Feb. 9, 2021, total 767 pages.

802.11b-1999, IEEE Standard for Information Technology-Telecommunications and information exchange between systems—Local and Metropolitan networks—Specific requirements—Part 11: Wireless LAN Medium Access Control (MAC) and Physical Layer (PHY) specifications: Higher Speed Physical Layer (PHY) Extension in the 2.4 GHz band, LAN/MAN Standards Committeeof theIEEE Computer Society, Sep. 16, 1999, total 97 pages.

802.11n, IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput, IEEE Computer Society, Sep. 11, 2009, total 536 pages.

IEEE P802.11be/D1.6, Draft Standard for Information technology Telecommunications and information exchange between systems Local and metropolitan area networks Specific requirements Part 11: Wireless LAN Medium Access Control (MAC) and Physical Layer (PHY) Specifications Amendment 8: Enhancements for extremely high throughput (EHT), LAN/MAN Standards Committee of the IEEE Computer Society, May 2022, total 887 pages.

IEEE P802.11-REVme/D1.2, Draft Standard for Information Technology Telecommunications and Information Exchange between Systems Local and Metropolitan Area Networks Specific Requirements/D1.2, Apr. 2022 Part 11: Wireless LAN Medium Access Control (MAC) and Physical Layer (PHY) Specifications, Apr. 2022, total 6099 pages.

802.11a-IEEE Standard for Telecommunications and Information Exchange Between Systems—LAN/MAN Specific Requirements—Part 11: Wireless Medium Access Control (MAC) and physical layer (PHY) specifications: High Speed Physical Layer in the 5 GHz band, LAN/MAN Standards Committee of the IEEE Computer Society, Dec. 16, 1999, total 90 pages.

802.11g-IEEE Standard for Information technology—Local and metropolitan area networks—Specific requirements—Part 11: Wireless LAN Medium Access Control (MAC) and Physical Layer (PHY) Specifications: Further Higher Data Rate Extension in the 2.4 GHz Band, LAN/MAN Standards Committee of the IEEE Computer Society, Jun. 12, 2003, total 77 pages.

Park et al: "CC36 Comment Resolution for EMLSR—Part 2", IEEE 802.11-21/287r9, Aug. 31, 2021, pp. 1-8, XP009551148.

Minyoung Park (Intel Corp): "CC36 Comment Resolution CID 7888", IEEE 802.11-21/1483r3, Sep. 3, 2021, pp. 1-3, XP068188814.

802.11—TIM and DTIM Information Elements, HPE Community, Jan. 25, 2016, total 8 pages.

* cited by examiner

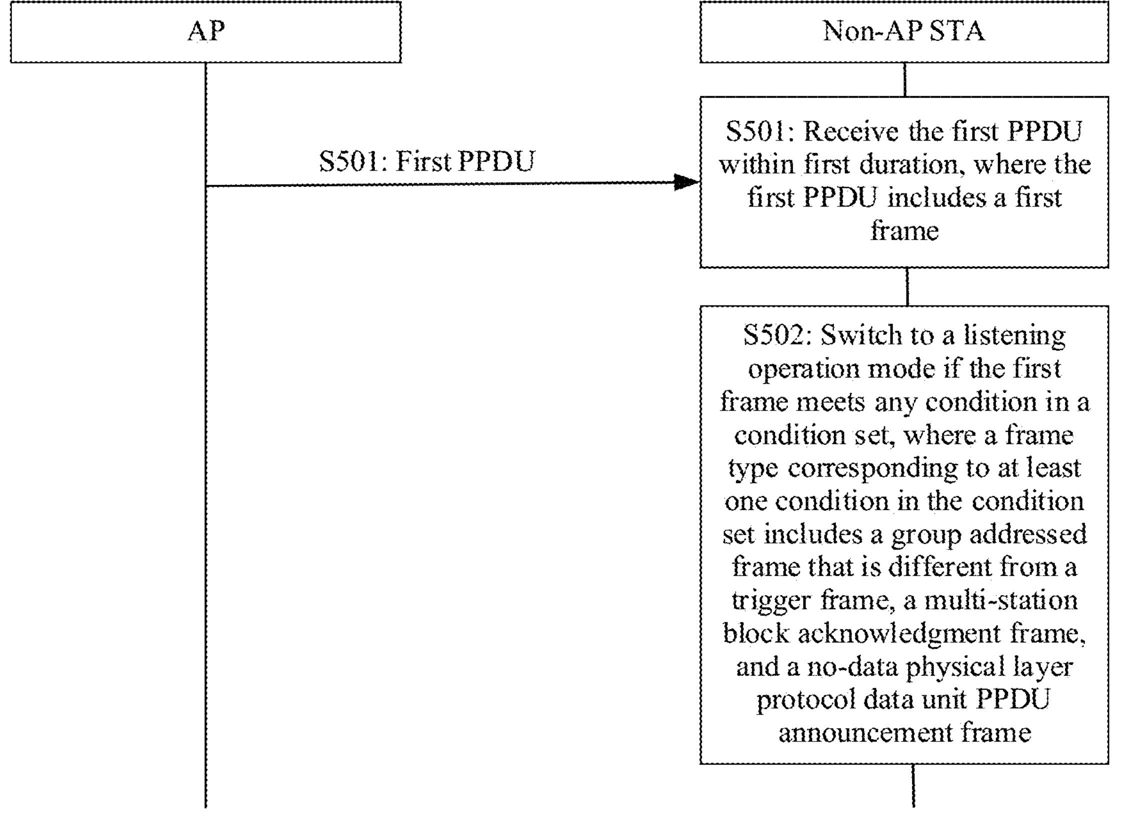

FIG. 5

S601: A non-AP STA determines that any condition in a condition set is met, where the condition set includes the following condition: a group addressed frame is received, the group addressed frame is different from a broadcast frame, and a receiving device indicated by the multicast frame does not include the non-AP STA

↓

S602: The non-AP STA switches to a listening operation mode

FIG. 6

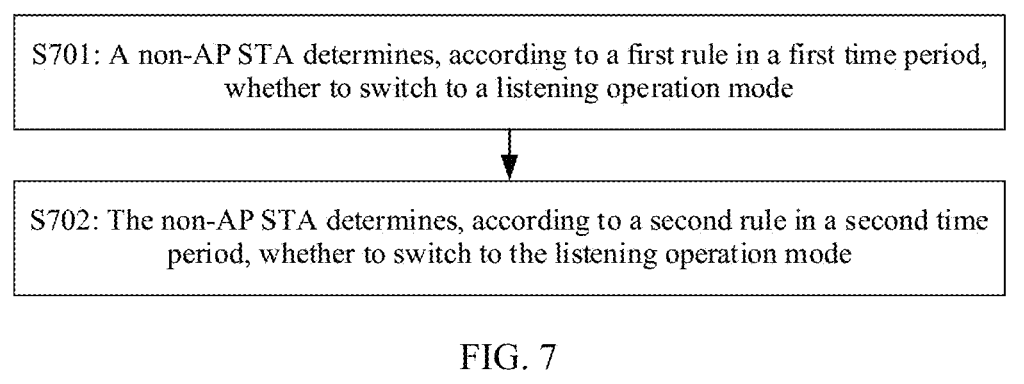

S701: A non-AP STA determines, according to a first rule in a first time period, whether to switch to a listening operation mode S702: The non-AP STA determines, according to a second rule in a second time period, whether to switch to the listening operation mode

FIG. 7

MULTI-LINK-BASED COMMUNICATION METHOD AND APPARATUS

CROSS-REFERENCE TO RELATED APPLICATIONS

This is a continuation of International Patent Application No. PCT/CN2023/098930 filed on Jun. 7, 2023, which claims priority to Chinese Patent Application No. 202210689577.2 filed on Jun. 16, 2022. The disclosures of the aforementioned applications are hereby incorporated by reference in their entireties.

TECHNICAL FIELD

This disclosure relates to the field of communication technologies, and in particular, to a multi-link-based communication method and an apparatus.

BACKGROUND

A multi-link operation (MLO) technology is introduced to achieve a technical objective of extremely high throughput. In the MLO technology, a non-wireless access point (AP) multi-link device (MLD) has only a capability of receiving and sending over a single radio chain, but can enter a listening operation on a plurality of links. In the listening operation, the non-AP MLD performs receiving on each link over one radio chain. After a wireless AP MLD successfully sends an initial control frame to the non-AP MLD on any link i, the non-AP MLD switches all radio chains to the link i for frame interaction with the AP MLD, and switches all the radio chains back to links for a listening operation after frame interaction ends.

If the non-AP MLD receives a group addressed frame during frame interaction with an AP, the non-AP MLD switches back the radio chains to the links to perform a listening operation. Consequently, all frames sent to the non-AP MLD after the group addressed frame fail to be received.

SUMMARY

This disclosure provides a multi-link-based communication method and an apparatus, to resolve a problem of an improper switching operation in an MLO.

According to a first aspect, this disclosure provides a multi-link-based communication method. The method may be performed by a receiver side device such as a non-AP MLD, and may be a non-AP station (STA) in the non-AP MLD, or may be a chip, a circuit, or another component configured to implement a function of the receiver side device. For example, the method is performed by the non-AP STA. The method includes receiving a first physical layer protocol data unit (PPDU) within a first duration, where the first PPDU includes a first frame, and switching to a listening operation mode if the first frame does not meet all conditions in a condition set, where at least one condition in the condition set is frame information of a group addressed frame, and the group addressed frame is different from a trigger frame, a multi-station block acknowledgment frame, and a no-data PPDU announcement frame.

In embodiments of this disclosure, a related condition of the group addressed frame other than the trigger frame, the multi-station block acknowledgment frame, and the no-data PPDU announcement frame is added to the condition set, so that the non-AP STA can determine, based on information about the group addressed frame when performing a switching operation, whether to switch to the listening operation mode. Compared with a technology in which the non-AP STA directly switches to the listening operation mode after the group addressed frame is received, in this embodiment, after the group addressed frame is received, whether to switch to the listening operation mode can be determined based on the information about the group addressed frame. For example, when the received group addressed frame does not meet all the conditions in the condition set, the non-AP STA switches to the listening operation mode, or when the received group addressed frame meets any condition in the condition set, the non-AP STA does not switch to the listening operation mode. This can improve flexibility, and can ensure that the group addressed frame and a subsequent frame can be received in time, to improve rationality of the switching operation.

In a possible design, the at least one condition includes when a frame type is a group addressed frame, the group addressed frame is different from a broadcast frame. In other words, the group addressed frame is not the broadcast frame, and a receiving device indicated by the group addressed frame includes the station.

If the foregoing condition is not met, the non-AP STA switches to the listening operation mode, or if the foregoing condition is met, the non-AP STA does not switch to the listening operation mode. Thus, when receiving a group addressed frame sent to the non-AP STA, the non-AP STA may determine not to switch to the listening operation mode. This can ensure that the group addressed frame and a subsequent frame can be received in time. In addition, based on the foregoing condition, the non-AP STA may switch to the listening operation mode in time when receiving a group addressed frame that is not sent to the non-AP STA. This can reduce a delay in communication with an access point on another link.

In a possible design, the at least one condition includes, the frame type is a broadcast frame, and a transmitter address carried in the broadcast frame is an address of an access point affiliated with the station, or the frame type is a broadcast frame, and a receiving device indicated by the broadcast frame includes the station.

If the foregoing condition is not met, the non-AP STA switches to the listening operation mode, or if the foregoing condition is met, the non-AP STA does not switch to the listening operation mode. Thus, when receiving the broadcast frame sent to the non-AP STA or the broadcast frame sent by the access point affiliated with the non-AP STA, the non-AP STA may determine not to switch to the listening operation mode. This can ensure that the group addressed frame and a subsequent frame can be received in time.

In addition, the foregoing conditions may cover the trigger frame, the multi-station block acknowledgment frame, and the no-data PPDU announcement frame, so that conditions of the trigger frame, the multi-station block acknowledgment frame, and the no-data PPDU announcement frame may not be separately listed in the condition set. This can simplify protocol description based on the foregoing condition, and reduce implementation complexity.

In a possible design, the broadcast frame is different from the trigger frame, the multi-station block acknowledgment frame, and the no-data PPDU announcement frame. A conflict or repetition with current switching rule logic can be avoided in the foregoing manner.

In a possible design, the condition set further includes at least one of the following five conditions: the frame type is an individually addressed frame, and a receiver address carried in the individually addressed frame is an address of the station; the frame type is a trigger frame, the trigger frame includes a first field indicating user information, and the first field indicates the station; the frame type is a clear to send frame, and a receiver address carried in the clear to send frame is the address of the access point station affiliated with the station; the frame type is a multi-station block acknowledgment frame, the multi-station block acknowledgment frame includes a second field indicating station information, and the second field indicates the station; and the frame type is a no-data PPDU announcement frame, the no-data PPDU announcement frame includes a third field indicating the station information, and the third field indicates the station.

According to a second aspect, this disclosure provides a multi-link-based communication method. The method may be performed by a receiver side device such as a non-AP MLD, and may be a non-AP STA in the non-AP MLD, or may be a chip, a circuit, or another component configured to implement a function of a receiver side device. For example, the method is performed by the non-AP STA. The method includes receiving a first PPDU within first duration, where the first PPDU includes a first frame, and switching to a listening operation mode if the first frame meets any condition in a condition set, where a frame type corresponding to at least one condition included in the condition set includes a group addressed frame, and the group addressed frame is different from a trigger frame, a multi-station block acknowledgment frame, and a no-data physical layer protocol data unit PPDU announcement frame.

In this embodiment, a condition that may cover a group addressed frame other than the trigger frame, the multi-station block acknowledgment frame, and the no-data PPDU announcement frame is added to the condition set, so that the non-AP STA can determine, based on information about the group addressed frame when performing a switching operation, whether to switch to the listening operation mode. Compared with a technology in which the non-AP STA directly switches to the listening operation mode after the group addressed frame is received, in this embodiment, after the group addressed frame is received, whether to switch to the listening operation mode can be determined based on the information about the group addressed frame. For example, in the foregoing method, when any condition in the condition set is met the non-AP STA switches to the listening operation mode; or when all conditions in the condition set are not met, the non-AP STA does not switch to the listening operation mode. This can improve flexibility, and can ensure that the group addressed frame and a subsequent frame can be received in time, to improve rationality of the switching operation.

In a possible design, the at least one condition includes at least one of the following three conditions: a transmitter address in the frame is not an address of an access point station affiliated with the station; a frame type is a broadcast frame, and a target receiving device indicated by the broadcast frame does not include the station; and the frame type is a group addressed frame, the group addressed frame is different from the broadcast frame, and a receiving device indicated by the group addressed frame does not include the station.

In the foregoing design, if one of the foregoing conditions is met, the non-AP STA switches to the listening operation mode, or if the foregoing conditions are not met, it indicates that the first frame is a group addressed frame sent to the non-AP STA, and when receiving the group addressed frame sent to the non-AP STA, the non-AP STA may determine not to switch to the listening operation mode. This can ensure that the group addressed frame and the subsequent frame can be received in time.

In a possible design, the at least one condition includes at least one of the following two conditions, a transmitter address in the frame is not an address of an access point station affiliated with the station and a frame type is a group addressed frame, the group addressed frame is different from a broadcast frame, and a receiving device indicated by the group addressed frame does not include the station.

In this manner, this can simplify protocol description, and reduce implementation complexity. In addition, when receiving the group addressed frame sent to the non-AP STA, the non-AP STA may determine not to switch to the listening operation mode. This can ensure that the group addressed frame and the subsequent frame can be received in time.

In a possible design, the condition set further includes at least one of the following five conditions: the frame type is an individually addressed frame, and a receiver address carried in the individually addressed frame is not an address of the station; the frame type is a trigger frame, a first field included in the trigger frame does not indicate the station, and the first field indicates user information; the frame type is a clear to send frame, and a receiver address carried in the clear to send frame is not the address of the access point station affiliated with the station; the frame type is a multi-station block acknowledgment frame, a second field included in the multi-station block acknowledgment frame does not indicate the station, and the second field indicates station information; and the frame type is a no-data PPDU announcement frame, a third field included in the no-data PPDU announcement frame does not indicate the station, and the third field indicates the station information.

In this manner, when receiving the group addressed frame sent to the non-AP STA, the non-AP STA may determine not to switch to the listening operation mode. This can ensure that the group addressed frame and the subsequent frame can be received in time.

According to a third aspect, this disclosure provides a multi-link-based communication method. The method may be performed by a receiver side device such as a non-AP MLD, and may be a non-AP STA in the non-AP MLD, or may be a chip, a circuit, or another component configured to implement a function of a receiver side device. For example, the method is performed by the non-AP STA. The method includes receiving a PPDU and switching to a listening operation if a basic service set indicated by the PPDU is an external basic service set.

Some rules for switching to the listening operation mode are based on media access control (MAC) layer information, and are carried in a data part. However, an inter-basic service set (BSS) PPDU may be determined by using a physical layer signal (SIG) field, the SIG field is before the data part in the PPDU. Therefore, in the foregoing manner, the non-AP STA switches to the listening operation mode when the inter-BSS PPDU is detected, and MAC content in the data part of the PPDU does not need to be further parsed, so that switching can be performed in time. This helps reduce a delay in communication with an AP on another link.

According to a fourth aspect, this disclosure provides a multi-link-based communication method. The method may be performed by a receiver side device such as a non-AP MLD, and may be a non-AP STA in the non-AP MLD, or may be a chip, a circuit, or another component configured to implement a function of a receiver side device. For example, the method is performed by the non-AP STA. The method includes determining that any condition in a condition set is met and switching to a listening operation mode, where the condition set includes the following conditions, a group addressed frame is received, the group addressed frame is different from a broadcast frame, and a receiving device indicated by the group addressed frame does not include the station.

In this embodiment, a condition that may cover a group addressed frame other than a trigger frame, a multi-station block acknowledgment frame, and a no-data PPDU announcement frame is added, so that the non-AP STA can determine, based on information about the group addressed frame when performing a switching operation, whether to switch to the listening operation mode. Compared with a technology in which a non-AP STA directly switches to the listening operation mode after the group addressed frame is received, after the group addressed frame is received, whether to switch to the listening operation mode can be determined based on the information about the group addressed frame. This can improve flexibility, and ensure that the group addressed frame and a subsequent frame can be received in time, to improve rationality of the switching operation.

In a possible design, the condition set further includes at least one of the following three conditions, the trigger frame is received, a first field included in the trigger frame does not indicate the station, and the first field indicates user information, the multi-station block acknowledgment frame is received, a second field included in the multi-station block acknowledgment frame does not indicate the station, and the second field indicates station information, and a no-data PPDU announcement frame is received, a third field included in the no-data PPDU announcement frame does not indicate the station, and the third field indicates the station information.

In a possible design, the condition set includes that the broadcast frame is received, and a target receiving device indicated by the broadcast frame does not include the station.

The condition that may cover the group addressed frame other than the trigger frame, the multi-station block acknowledgment frame, and the no-data PPDU announcement frame is added, so that the non-AP STA can determine, based on the information about the group addressed frame when performing the switching operation, whether to switch to the listening operation mode.

In a possible design, the condition set further includes that an extremely high throughput multi-station block PPDU is received, where a basic service set indicated by the extremely high throughput multi-station block PPDU is the same as a basic service set of a cell in which the station is located, the extremely high throughput multi-station block PPDU does not indicate that the station is a receiving device, and a value of a basic service set disabled field carried in a high efficiency operation element last received by the station is 0.

In the foregoing design, the condition set is improved, so that rationality of the switching operation can be improved.

In a possible design, the condition set further includes at least one of the following conditions: an individually addressed frame is received, and a destination address carried in the individually addressed frame is different from an address of the station; a frame is received, and a transmitter address carried in the frame is different from a transmitter address carried in a frame that initiates a current transmission opportunity; a frame is received, and a basic service set corresponding to the frame is different from the basic service set of the cell in which the station is located; a high efficiency multi-station block PPDU is received, a basic service set indicated by the high efficiency multi-station block PPDU is different from the basic service set of the cell in which the station is located, the high efficiency multi-station block PPDU does not indicate that the station is the receiving device, and the value of the basic service set disabled field carried in the high efficiency operation element last received by the station is 0; and a carrier sense mechanism indicates that a channel is continuously idle for preset duration.

According to a fifth aspect, this disclosure provides a multi-link-based communication method. The method may be performed by a receiver side device such as a non-AP MLD, and may be a non-AP STA in the non-AP MLD, or may be a chip, a circuit, or another component configured to implement a function of a receiver side device. For example, the method is performed by the non-AP STA. The method includes determining, in a first time period according to a first rule, whether to switch to a listening operation mode, where a start moment of the first time period is preset time or receiving time of a first beacon frame, and the first time period is used to receive a group addressed frame, and determining, in a second time period according to a second rule, whether to switch to the listening operation mode, where a start moment of the second time period is receiving time of an initial control frame.

In this embodiment, group addressed frames are centrally sent to the non-AP STA in a specific time period (namely, the first time period), and different switching rules are used in the time period and the second time period. This can ensure that the group addressed frame and a subsequent frame can be received in time, and can reduce a loss of a subsequent transmission opportunity.

In a possible design, determining, according to a first rule, whether to switch to a listening operation mode includes switching to the listening operation mode if any condition in a first condition set is met.

The first condition set includes at least one of the following, a group addressed frame indicating that transmission is completed is received, a timer expires, and start time of the timer is the start moment of the first time period, and a total length of a transmission opportunity, starting from the start moment of the first time period, of a first access point station affiliated with the station reaches preset duration.

In the foregoing design, the non-AP STA can switch to the listening operation mode in time, so that the non-AP STA can communicate with an access point in time on another link.

In a possible design, the preset time is pre-acquired sending time of the first beacon frame.

In a possible design, the first beacon frame is a delivery traffic indication map beacon frame.

In a possible design, starting of the first time period and the second time period may be determined based on the receiving time of the first beacon frame (or the preset time) and the receiving time of the initial control frame.

In a possible design, if the non-AP STA receives the group addressed frame in the first time period, and the group addressed frame indicates “transmission is not completed”, the non-AP STA continues to receive the group addressed frame on the link.

In a possible design, determining, according to a second rule, whether to switch to the listening operation mode includes receiving a first frame within first duration of the second time period, and switching to the listening operation mode if the first frame does not meet all conditions in a second condition set.

In a possible design, the second condition set includes at least one of the following conditions: a frame type is a broadcast frame, the broadcast frame is different from a trigger frame, a multi-station block acknowledgment frame, and a no-data PPDU announcement frame, and a transmitter address carried in the broadcast frame is an address of an access point station affiliated with the station; the frame type is a group addressed frame, the group addressed frame is different from the broadcast frame, and a receiving device indicated by the group addressed frame includes the station; the frame type is an individually addressed frame, and a receiver address carried in the individually addressed frame is an address of the station; the frame type is a trigger frame, the trigger frame includes a first field indicating user information, and the first field indicates the station; the frame type is a clear to send frame, and a receiver address carried in the clear to send frame is the address of the access point station affiliated with the station; the frame type is a multi-station block acknowledgment frame, the multi-station block acknowledgment frame includes a second field indicating station information, and the second field indicates the station; and the frame type is a no-data PPDU announcement frame, the no-data PPDU announcement frame includes a third field indicating the station information, and the third field indicates the station.

Two conditions of the group addressed frame are added, so that when receiving a group addressed frame that does not meet the foregoing condition set, the non-AP STA can switch to the listening operation mode, or when receiving a group addressed frame that meets the foregoing condition set, the non-AP STA does not switch to the listening operation mode. This can ensure that the group addressed frame and a subsequent frame can be received in time. In addition, based on the foregoing two conditions, the non-AP STA may switch to the listening operation mode in time when receiving a group addressed frame that is not sent to the non-AP STA. This can reduce a delay in communication with an access point on another link.

In a possible design, the second condition set includes at least one of the following conditions: a frame type is a broadcast frame, and a transmitter address carried in the broadcast frame is an address of an access point station affiliated with the station; the frame type is a group addressed frame, the group addressed frame is different from the broadcast frame, and a receiving device indicated by the group addressed frame includes the station; the frame type is an individually addressed frame, and a receiver address carried in the individually addressed frame is an address of the station; and the frame type is a clear to send frame, and a receiver address carried in the clear to send frame is the address of the access point station affiliated with the station.

The foregoing conditions may cover the trigger frame, the multi-station block acknowledgment frame, the no-data PPDU announcement frame, and another group addressed frame, so that conditions of the trigger frame, the multi-station block acknowledgment frame, and the no-data PPDU announcement frame may not be separately listed in the second condition set. This can simplify protocol description, and reduce implementation complexity. In addition, when receiving a group addressed frame sent to the non-AP STA, the non-AP STA may determine not to switch to the listening operation mode. This can ensure that the group addressed frame and a subsequent frame can be received in time.

In a possible design, the second condition set includes at least one of the following conditions: a frame type is a broadcast frame, and a receiving device indicated by the broadcast frame includes the station; the frame type is a group addressed frame, the group addressed frame is different from the broadcast frame, and a receiving device indicated by the group addressed frame includes the station; the frame type is an individually addressed frame, and a receiver address carried in the individually addressed frame is an address of the station; and the frame type is a clear to send frame, and a receiver address carried in the clear to send frame is the address of the access point station affiliated with the station.

The foregoing conditions may cover the trigger frame, the multi-station block acknowledgment frame, the no-data PPDU announcement frame, and another group addressed frame, so that conditions of the trigger frame, the multi-station block acknowledgment frame, and the no-data PPDU announcement frame may not be separately listed in the second condition set. This can simplify protocol description, and reduce implementation complexity. In addition, when receiving a group addressed frame sent to the non-AP STA, the non-AP STA may determine not to switch to the listening operation mode. This can ensure that the group addressed frame and a subsequent frame can be received in time.

In a possible design, determining, according to a second rule, whether to switch to the listening operation mode includes receiving a second frame and switching to the listening operation mode if the second frame meets any condition in a third condition set.

In a possible design, the third condition set includes at least one of the following conditions: a transmitter address in the frame is not the address of the access point station affiliated with the station; a frame type is a broadcast frame, the broadcast frame is different from the trigger frame, the multi-station block acknowledgment frame, and the no-data PPDU announcement frame, and a target receiving device indicated by the broadcast frame does not include the station; the frame type is a group addressed frame, the group addressed frame is different from the broadcast frame, and a receiving device indicated by the group addressed frame does not include the station; the frame type is an individually addressed frame, and a receiver address carried in the individually addressed frame is not the address of the station; the frame type is a trigger frame, a first field included in the trigger frame does not indicate the station, and the first field indicates the user information; the frame type is a clear to send frame, and a receiver address carried in the clear to send frame is not the address of the access point station affiliated with the station; the frame type is a multi-station block acknowledgment frame, a second field included in the multi-station block acknowledgment frame does not indicate the station, and the second field indicates the station information; and the frame type is a no-data PPDU announcement frame, a third field included in the no-data PPDU announcement frame does not indicate the station, and the third field indicates the station information.

A condition that may cover another group addressed frame is added, so that when receiving a group addressed frame that is not sent to the non-AP STA, the non-AP STA can determine to switch to the listening operation mode, or when receiving a group addressed frame sent to the non-AP STA, the non-AP STA determines not to switch to the listening operation mode. This can ensure that the group addressed frame and a subsequent frame can be received in time.

In a possible design, the third condition set includes at least one of the following conditions: a transmitter address in the frame is not the address of the access point station affiliated with the station; the frame type is a group addressed frame, the group addressed frame is different from the broadcast frame, and the receiving device indicated by the group addressed frame does not include the station; the frame type is an individually addressed frame, and the receiver address carried in the individually addressed frame is not the address of the station; the frame type is a trigger frame, the first field included in the trigger frame does not indicate the station, and the first field indicates the user information; the frame type is a clear to send frame, and the receiver address carried in the clear to send frame is not the address of the access point station affiliated with the station; the frame type is a multi-station block acknowledgment frame, the second field included in the multi-station block acknowledgment frame does not indicate the station, and the second field indicates the station information; and the frame type is a no-data PPDU announcement frame, the third field included in the no-data PPDU announcement frame does not indicate the station, and the third field indicates the station information.

In this example, when receiving a group addressed frame that is not sent to the non-AP STA, the non-AP STA may determine to switch to the listening operation mode, or when receiving a group addressed frame sent to the non-AP STA, the non-AP STA determines not to switch to the listening operation mode. This can ensure that the group addressed frame and a subsequent frame can be received in time.

In a possible design, the third condition set includes at least one of the following conditions: a transmitter address in the frame is not the address of the access point station affiliated with the station; a frame type is a group addressed frame, and a receiving device indicated by the group addressed frame does not include the station; the frame type is an individually addressed frame, and a receiver address carried in the individually addressed frame is not the address of the station; and the frame type is a clear to send frame, and a receiver address carried in the clear to send frame is not the address of the access point station affiliated with the station.

The foregoing conditions may cover the trigger frame, the multi-station block acknowledgment frame, the no-data PPDU announcement frame, and another group addressed frame, so that conditions of the trigger frame, the multi-station block acknowledgment frame, and the no-data PPDU announcement frame may not be separately listed in the third condition set. This can simplify protocol description, and reduce implementation complexity. In addition, when receiving the group addressed frame that is not sent to the non-AP STA, the non-AP STA may determine to switch to the listening operation mode, or when receiving the group addressed frame sent to the non-AP STA, the non-AP STA determines not to switch to the listening operation mode. This can ensure that the group addressed frame and a subsequent frame can be received in time.

In a possible design, the third condition set includes at least one of the following conditions: the group addressed frame is received, the group addressed frame is different from the broadcast frame, and the receiving device indicated by the group addressed frame does not include the station; the trigger frame is received, the first field included in the trigger frame does not indicate the station, and the first field indicates the user information; the multi-station block acknowledgment frame is received, the second field included in the multi-station block acknowledgment frame does not indicate the station, and the second field indicates the station information; the no-data PPDU announcement frame is received, the third field included in the no-data PPDU announcement frame does not indicate the station, and the third field indicates the station information; the individually addressed frame is received, and a destination address carried in the individually addressed frame is different from the address of the station; a frame is received, and a transmitter address carried in the frame is different from a transmitter address carried in a frame that initiates a current transmission opportunity; a frame is received, and a basic service set corresponding to the frame is different from a basic service set of a cell in which the station is located; a PPDU is received, the PPDU is a high efficiency multi-station block PPDU or an extremely high throughput multi-station block PPDU, a basic service set indicated by the PPDU is the same as the basic service set of the cell in which the station is located, the PPDU does not indicate that the station is a receiving device, and a value of a basic service set disabled field carried in a high efficiency operation element last received by the station is 0; and a carrier sense mechanism indicates that a channel is continuously idle for preset duration.

A condition that may cover a group addressed frame other than the trigger frame, the multi-station block acknowledgment frame, and the no-data PPDU announcement frame is added, so that the non-AP STA can determine, based on information about the group addressed frame when performing a switching operation, whether to switch to the listening operation mode. Compared with the technology in which the non-AP STA directly switches to the listening operation mode after the group addressed frame is received, in embodiments of this disclosure, after the group addressed frame is received, whether to switch to the listening operation mode can be determined based on the information about the group addressed frame. This can improve flexibility, and ensure that the group addressed frame and the subsequent frame can be received in time, to improve rationality of the switching operation.

In a possible design, the third condition set includes at least one of the following conditions: the group addressed frame is received, and the receiving device indicated by the group addressed frame does not include the station; the individually addressed frame is received, and a destination address carried in the individually addressed frame is different from the address of the station; a frame is received, and a transmitter address carried in the frame is different from a transmitter address carried in a frame that initiates a current transmission opportunity; a frame is received, and a basic service set corresponding to the frame is different from a basic service set of a cell in which the station is located; a PPDU is received, the PPDU is a high efficiency multi-station block PPDU or an extremely high throughput multi-station block PPDU, a basic service set indicated by the PPDU is different from the basic service set of the cell in which the station is located, the PPDU does not indicate that the station is a receiving device, and a value of a basic service set disabled field carried in a high efficiency operation element last received by the station is 0; and a carrier sense mechanism indicates that a channel is continuously idle for preset duration.

The foregoing conditions may cover the trigger frame, the multi-station block acknowledgment frame, the no-data PPDU announcement frame, and another group addressed frame, so that conditions of the trigger frame, the multi-station block acknowledgment frame, and the no-data PPDU announcement frame may not be separately listed in the third condition set. This can simplify protocol description, and reduce implementation complexity. In addition, when receiving the group addressed frame sent to the non-AP STA, the non-AP STA may determine whether to switch to the listening operation mode. This can ensure that the group addressed frame and a subsequent frame can be received in time.

In a possible design, the third condition set includes at least one of the following conditions: the group addressed frame is received, the group addressed frame is different from the broadcast frame, and the receiving device indicated by the group addressed frame does not include the station; the broadcast frame is received, and a target receiving device indicated by the broadcast frame does not include the station; a frame is received, and a transmitter address carried in the frame is different from a transmitter address carried in a frame that initiates a current transmission opportunity; a frame is received, and a basic service set corresponding to the frame is different from a basic service set of a cell in which the station is located; a PPDU is received, the PPDU is a high efficiency multi-station block PPDU or an extremely high throughput multi-station block PPDU, a basic service set indicated by the PPDU is different from the basic service set of the cell in which the station is located, the PPDU does not indicate that the station is a receiving device, and a value of a basic service set disabled field carried in a high efficiency operation element last received by the station is 0; and a carrier sense mechanism indicates that a channel is continuously idle for preset duration.

The foregoing conditions may cover the trigger frame, the multi-station block acknowledgment frame, the no-data PPDU announcement frame, and another group addressed frame, so that conditions of the trigger frame, the multi-station block acknowledgment frame, and the no-data PPDU announcement frame may not be separately listed in the third condition set. This can simplify protocol description, and reduce implementation complexity. In addition, when receiving the group addressed frame sent to the non-AP STA, the non-AP STA may determine not to switch to the listening operation mode. This can ensure that the group addressed frame and a subsequent frame can be received in time.

In a possible design, if the initial control frame indicates that the second time period includes the group addressed frame, whether to switch to the listening operation mode is determined based on the second condition set or the third condition set.

In a possible design, if the initial control frame indicates that the second time period does not include the group addressed frame, determining, according to a second rule, whether to switch to the listening operation mode may include receiving a third frame and switching to the listening operation mode if the third frame does not meet all conditions in a fourth condition set.

The fourth condition set includes at least one of the following conditions: a frame type is an individually addressed frame, and a receiver address carried in the individually addressed frame is the address of the station; the frame type is a trigger frame, the trigger frame includes a first field indicating the user information, and the first field indicates the station; the frame type is a clear to send frame, and a receiver address carried in the clear to send frame is the address of the access point station affiliated with the station; the frame type is a multi-station block acknowledgment frame, the multi-station block acknowledgment frame includes a second field indicating the station information, and the second field indicates the station; and the frame type is a no-data PPDU announcement frame, the no-data PPDU announcement frame includes a third field indicating the station information, and the third field indicates the station.

According to a sixth aspect, this disclosure further provides a multi-link-based communication apparatus. The communication apparatus has a function of implementing any method provided in any one of the first aspect to the fifth aspect. The communication apparatus may be implemented by hardware, or may be implemented by hardware executing corresponding software. The hardware or software includes one or more units or modules corresponding to the foregoing function.

In a possible design, the communication apparatus includes a processor, and the processor is configured to support the communication apparatus to execute a corresponding function of the non-AP STA in the foregoing communication method. The communication apparatus may further include a memory. The memory may be coupled to the processor, and the memory stores program instructions and data that are necessary for the communication apparatus. Optionally, the communication apparatus further includes an interface circuit, and the interface circuit is configured to support communication between the communication apparatus and another device.

In a possible design, the communication apparatus includes corresponding functional modules, which are respectively configured to implement the steps in the foregoing method. The function may be implemented by hardware, or may be implemented by hardware executing corresponding software. The hardware or software includes one or more modules corresponding to the foregoing function.

In a possible design, a structure of the communication apparatus includes a processing module and a communication module. These modules may perform corresponding functions in the foregoing method examples. For details, refer to the descriptions in the method provided in any one of the first aspect to the fifth aspect. Details are not described herein again.

According to a seventh aspect, a multi-link-based communication apparatus is provided. The communication apparatus includes a processor and an interface circuit. The interface circuit is configured to receive a signal from a communication apparatus other than the communication apparatus and send the signal to the processor, or send a signal from the processor to a communication apparatus other than the communication apparatus. The processor is configured to implement the method in any one of the first aspect to the fifth aspect and the possible designs of the first aspect to the fifth aspect by using a logic circuit or executing code instructions.

According to an eighth aspect, a computer-readable storage medium is provided. The computer-readable storage medium stores a computer program or instructions. When the computer program or the instructions are executed by a processor, the method in any one of the first aspect to the fifth aspect and the possible designs of the first aspect to the fifth aspect is implemented.

According to a ninth aspect, a computer program product storing instructions is provided. When the instructions are run by a processor, the method in any one of the first aspect to the fifth aspect and the possible designs of the first aspect to the fifth aspect is implemented.

According to a tenth aspect, a chip system is provided. The chip system includes a processor, and may further include a memory, configured to implement the method in any one of the first aspect to the fifth aspect and the possible designs of the first aspect to the fifth aspect. The chip system may include a chip, or may include a chip and another discrete component.

According to an eleventh aspect, a communication system is provided. The system includes the apparatus (for example, a non-AP MLD or a non-AP STA) in the first aspect, and may further include an AP MLD or an access point.

According to a twelfth aspect, a communication system is provided. The system includes the apparatus (for example, a non-AP MLD or a non-AP STA) in the second aspect, and may further include an AP MLD or an access point.

According to a thirteenth aspect, a communication system is provided. The system includes the apparatus (for example, a non-AP MLD or a non-AP STA) in the third aspect, and may further include an AP MLD or an access point.

According to a fourteenth aspect, a communication system is provided. The system includes the apparatus (for example, a non-AP MLD or a non-AP STA) in the fourth aspect, and may further include an AP MLD or an access point.

According to a fifteenth aspect, a communication system is provided. The system includes the apparatus (for example, a non-AP MLD or a non-AP STA) in the fifth aspect, and may further include an AP MLD or an access point.

BRIEF DESCRIPTION OF DRAWINGS

FIG. 5 is a schematic flowchart of an MLO communication method applicable to an embodiment of this disclosure;

FIG. 6 is a schematic flowchart of an MLO communication method applicable to an embodiment of this disclosure;

FIG. 7 is a schematic flowchart of an MLO communication method applicable to an embodiment of this disclosure;

DESCRIPTION OF EMBODIMENTS

To make objectives, technical solution, and advantages of embodiments of this disclosure clearer, the following further describes embodiments in detail with reference to accompanying drawings.

The following describes some terms in embodiments of this disclosure, to facilitate understanding of persons skilled in the art.

Figure 1:
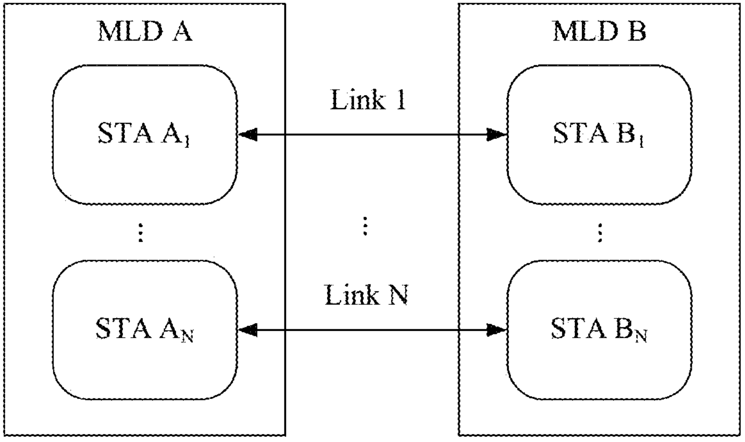
FIG. 1 is a schematic diagram of an MLO applicable to an embodiment of this disclosure.

1. MLO:

An MLO-supported wireless local area network (WLAN) device has a capability of sending and receiving over multi-band. The multi-band may include but is not limited to a 2.4 gigahertz (GHz) WI-FI frequency band, a 5 GHz WI-FI frequency band, and a 6 GHz WI-FI frequency band. Access and transmission performed on each frequency band may be referred to as a link, or access and transmission performed within one frequency range on a same frequency band may be referred to as a link. Therefore, access and transmission formed on a plurality of links may be referred to as the MLO. A device that supports a plurality of links is referred to as an MLD, and an internal entity, responsible for any link, in the MLD is referred to as a STA. If all STAs in an MLD are wireless access points (APs), the MLD may be referred to as an AP MLD; or if all STAs in an MLD are non-wireless AP STAs, the MLD may be referred to as a non-AP MLD. For example, as shown in FIG. 1, there are two MLDs: an MLD A and an MLD B, each of which has N links.

Figure 2:
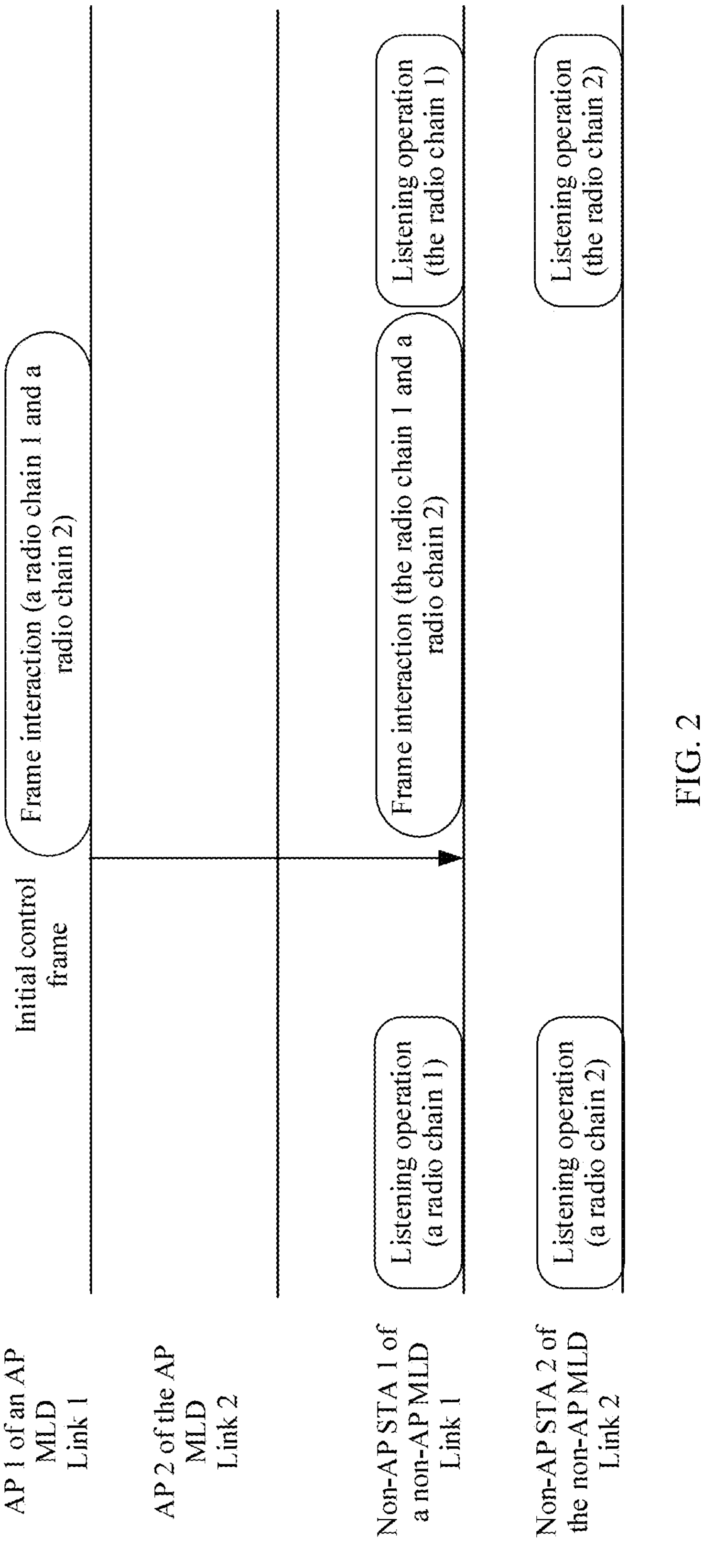
FIG. 2 is a schematic diagram of a switching operation applicable to an embodiment of this disclosure.

2. Enhanced Multi-Link Single Radio (EMLSR):

As shown in FIG. 2, a non-AP MLD has only a capability of receiving and sending over a single radio chain, but can enter a listening operation on a plurality of links. In the listening operation, the non-AP MLD performs receiving on each link over one radio chain. After an AP MLD successfully sends an initial control frame to the non-AP MLD on any link i, the non-AP MLD switches all radio chains to the link i for frame interaction with the AP MLDs, switches back the radio chains to links to return to the listening operation after the frame interaction ends.

3. Radio Chain:

The radio chain is a physical entity serving as a receive chain and/or a transmit chain.

The receive chain is a physical entity that implements signal processing to provide a received signal for a digital baseband. Signal processing includes filtering, amplification, down-conversion, sampling, and the like.

The transmit chain is a physical entity that implements signal processing to generate a transmitted signal from the digital baseband. Signal processing includes digital-to-analog conversion, filtering, amplification, up-conversion, and the like.

For example, the radio chain may be wireless, radio, or the like.

4. Group Addressed Frame and Broadcast Frame:

In example description, the group addressed frame is a frame oriented to a plurality of stations, and a MAC address of the group addressed frame corresponds to the plurality of stations. The broadcast frame is a group addressed frame used when a MAC address indicates a broadcast address. That is, the group addressed frame includes the broadcast frame, and the broadcast frame is a special group addressed frame.

In another example for description, the group addressed frame is a frame oriented to a group of stations, the broadcast frame is a frame oriented to all stations, and the group addressed frame and the broadcast frame are of two different frame types.

It should be noted that, for ease of description, in embodiments of this solution provided in this disclosure is described by using an example in which the group addressed frame includes the broadcast frame. It should be understood that embodiments are also described by using an example in which the group addressed frame and the broadcast frame are of two different frame types. For example, the following description by using the example in which the group addressed frame includes the broadcast frame is "a frame type is a group addressed frame, the group addressed frame is different from a broadcast frame, and a receiving device indicated by the group addressed frame includes the station". If the solution is described by using the example in which the group addressed frame and the broadcast frame are of two different frame types, the solution is described as "a frame type is a group addressed frame, and a receiving device indicated by the group addressed frame includes the station".

In embodiments of this disclosure, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists. A and B may be singular or plural. The character "/" generally indicates an "or" relationship between the associated objects. At least one of the following items (pieces) or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this disclosure are used to distinguish between a plurality of objects, and are not intended to limit sizes, content, an order, a time sequence, priorities, importance degrees, or the like of the plurality of objects. For example, a first time period and a second time period are merely used to distinguish between different time periods, but do not indicate different priorities, time sequences, importance, or the like of the two time periods.

For ease of description, a station in the MLD is used as an example for description in embodiments of this disclosure. In an example for description, the station in embodiments may be a STA in an MLD that supports EMLSR. A station in the non-AP MLD may be referred to as a non-AP STA, and a station in the AP MLD may be referred to as an AP.

The following describes technical features in embodiments of this disclosure.

The Institute of Electrical and Electronics Engineers (IEEE) 802.11be standard working group proposes an EMLSR working mechanism. When one of the following cases is met, a non-AP MLD needs to immediately switch an antenna back to each link for a listening operation.

Case 1: A non-AP STA does not receive a physical layer receiving start indication (PHY-RXSTART.indication) within timeout interval starting from time at which the non-AP STA replies with a most recently received frame from an AP or starting from time at which the non-AP STA receives a most recently received frame that is from the AP and that does not require immediate acknowledgment from the non-AP STA. Timeout interval=short interframe space (SIFS) time (aSIFSTime)+slot time (aSlotTime)+physical layer receiving start delay (aRxPHYStartDelay). The MAC of the STA affiliated with the non-AP MLD that received the initial control frame does not receive a PHY-RXSTART.indication primitive during a timeout interval of aSIFSTime+aSlotTime+aRxPHYStartDelay starting at the end of the PPDU transmitted by the STA of the non-AP MLD as a response to the most recently received frame from the AP affiliated with the AP MLD or starting at the end of the reception of the PPDU containing a frame for the STA from the AP affiliated with the AP MLD that does not require immediate acknowledgment.

Case 2: A non-AP STA receives a physical layer receiving start indication within timeout interval starting from time at which the non-AP STA replies with a most recently received frame from an AP or starting from time at which the non-AP STA receives a most recently received frame that is from the AP and that does not require immediate acknowledgment from the non-AP STA. However, when receiving a PPDU corresponding to the physical layer receiving start indication, the non-AP STA does not detect any one of the following frames (The MAC of the STA affiliated with the non-AP MLD that received the initial Control frame receives a PHY-RXSTART.indication primitive during a timeout interval of aSIFSTime+aSlotTime+aRxPHYStartDelay starting at the end of the PPDU transmitted by the STA of the non-AP MLD as a response to the most recently received frame from the AP affiliated with the AP MLD or starting at the end of the reception of the PPDU containing a frame for the STA from the AP affiliated with the AP MLD that does not require immediate acknowledgment and the STA affiliated with the non-AP MLD does not detect, within the PPDU corresponding to the PHY-RXSTART.indication any of the following frames): an individually addressed frame, where a receiving address (RA) in the frame is a MAC address of the non-AP STA (an individually addressed frame with the RA equal to the MAC address of the STA affiliated with the non-AP MLD); a trigger frame, where the frame includes a user information field (User Info) indicating the non-AP STA (a trigger frame that has one of the User Info fields addressed to the STA affiliated with the non-AP MLD); a clear to send (CTS-to-self) frame, where an RA address in the frame is a MAC address of an AP affiliated with the non-AP STA (a CTS-to-self frame with the RA equal to the MAC address of the AP affiliated with the AP MLD); a multi-station block acknowledgment frame (Multi-STA BlockAck), where the frame includes a "per association identifier traffic identifier information field" (Per AID TID Info) indicating the non-AP STA (a Multi-STA BlockAck frame that has one of the Per AID TID Info fields addressed to the STA affiliated with the non-AP MLD); and a no-data PPDU announcement frame (NDP Announcement (NDPA)), where the frame includes a STA information field (STA Info) indicating the non-AP STA (an NDPA frame that has one of the STA Info fields addressed to the STA affiliated with the non-AP MLD).

Case 3: A non-AP STA does not respond to a most recently received frame from an AP affiliated with the non-AP STA that requires immediate response (The STA affiliated with the non-AP MLD that received the initial control frame does not respond to the most recently received frame from the AP affiliated with the AP MLD that requires immediate response after a SIFS).

According to the foregoing rule, when a non-AP STA performs frame interaction with an AP after receiving an initial control frame sent by the AP, if a broadcast frame or a group addressed frame is received, the foregoing case 2 is matched, and therefore, a radio chain needs to be immediately switched back to each link for a listening operation. As a result, a subsequent frame cannot be received.

In view of this, a possible solution is not to send a broadcast frame or a group addressed frame to avoid antenna switching of the non-AP STA. As a result, the group addressed frame and the broadcast frame cannot be sent to the non-AP STA.

Another possible solution is to send a broadcast frame or a group addressed frame after all individually addressed frames are sent. Consequently, at most one broadcast frame or group addressed frame can be successfully sent. In addition, this also limits flexibility. Furthermore, the broadcast frame or the group addressed frame usually takes precedence over the individually addressed frame in many cases. As a result, the broadcast frame or the group addressed frame cannot be sent in time in this method.

Therefore, how to resolve a problem of an improper switching operation in an MLO is an urgent problem to be resolved.

In view of this, embodiments of this disclosure provide a multi-link-based communication method and an apparatus to resolve the problem of the improper switching operation in the MLO. The method and the apparatus are based on a same concept. The method and the apparatus have similar problem-resolving principles. Therefore, for implementations of the apparatus and the method, refer to each other. No repeated description is provided.

This disclosure is applied to a wireless local area network system that supports a next-generation WI-FI protocol of IEEE 802.11ax, for example, 802.11 series protocols such as 802.11be, WI-FI 7, or EHT, and a next-generation protocol of 802.11be, WI-FI 8, or WI-FI AI, and may be further applied to an ultra-wideband (UWB) based wireless personal local area network system, a sensing system, and the like.

The communication method provided in this disclosure may be further applied to other communication systems, for example, an Internet of things (IoT) system, a narrow band IoT (NB-IoT) system, a LongTerm Evolution (LTE) system, a 5th generation (5G) communication system, an LTE and 5G hybrid architecture, a 5G New Radio (NR) system, or a new communication system emerging in 6th generation (6G) or future communication development. The communication system provided may alternatively be a machine to machine (M2M) network, a non-terrestrial network (NTN) network, or another network.

Figure 3:
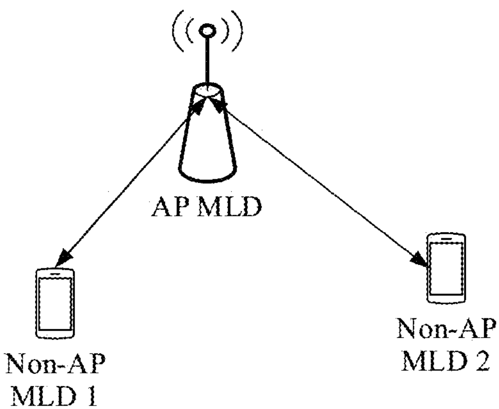
FIG. 3 is a schematic diagram of an architecture of a communication system to which an embodiment of this disclosure is applicable.

An application scenario of embodiments of this disclosure may be communication between an AP MLD and one or more non-AP MLDs, and is also applicable to communication between AP MLDs and communication between non-AP MLDs. For example, FIG. 3 is a diagram of a network architecture to which an embodiment is applicable. In FIG. 3, for example, the network includes a non-AP MLD 1 and a non-AP MLD 2 that are associated with an AP MLD. The AP MLD may communicate with the non-AP MLD 1 and the non-AP MLD 2, and the non-AP MLD 1 and the non-AP MLD 2 may communicate with each other. It should be understood that quantities of AP MLDs and non-AP MLDs shown in FIG. 3 are merely examples. There may be more or fewer AP MLDs and non-AP MLDs.

The non-AP MLDs in embodiments may be various user terminals, user apparatuses, access apparatuses, subscriber stations, subscriber units, mobile stations, user agents, user devices, or other devices that have a wireless communication function. The user terminals may include various handheld devices, vehicle-mounted devices, wearable devices, computing devices, or other processing devices connected to a wireless modem that have the wireless communication function and various forms of user equipment (UE), mobile stations (MSs), terminals, terminal equipment, portable communication devices, handheld devices, portable computing devices, entertainment devices, game devices or systems, and global positioning system devices, or any other suitable device configured to perform network communication by using a wireless medium. For ease of description, the devices mentioned above are collectively referred to as a non-AP MLD.

The AP MLD in embodiments is an apparatus that is deployed in a wireless communication network and that provides a wireless communication function. The AP MLD may be used as a hub of the communication system, and may be a communication device such as a base station, a router, a gateway, a repeater, a communication server, a switch, or a bridge. The base station may include various forms of macro base stations, micro base stations, relay stations, and the like. For ease of description, the devices mentioned above are collectively referred to as an AP MLD.

The AP MLD and the non-AP MLD in this application may be respectively an AP MLD and a non-AP MLD that are applicable to an IEEE 802.11be system standard, may be respectively an AP MLD and a non-AP MLD that are applicable to an IEEE 802.11 system standard, or may be respectively an AP MLD and a non-AP MLD that are applicable to another standard, for example, an AP MLD and a non-AP MLD that are applicable to a future standard.

A network architecture and a service scenario described in embodiments of this disclosure are intended to describe the technical solutions in embodiments more clearly, and do not constitute any limitation on the technical solutions provided in this disclosure. Persons of ordinary skill in the art may know that with evolution of the network architecture and emergence of new service scenarios, the technical solutions provided in embodiments are also applicable to similar technical problems.

In embodiments of this disclosure, "if . . . " may also be described as "in a case of . . . ", "if", "when . . . ", or the like. For example, "if a first frame does not meet all conditions in a set, switching to a listening operation mode" may also be described as "if the first frame does not meet all conditions in the condition set, switching to the listening operation mode", "in a case in which the first frame does not meet all the conditions in the condition set, switching to the listening operation mode", "when the first frame does not meet all the conditions in the condition set, switching to the listening operation mode", or the like.

In embodiments, a non-AP STA in the non-AP MLD is used as an example for description.

The following describes the technical solutions in embodiments of this disclosure with reference to accompanying drawings in embodiments.

Embodiment 1

Figure 4:
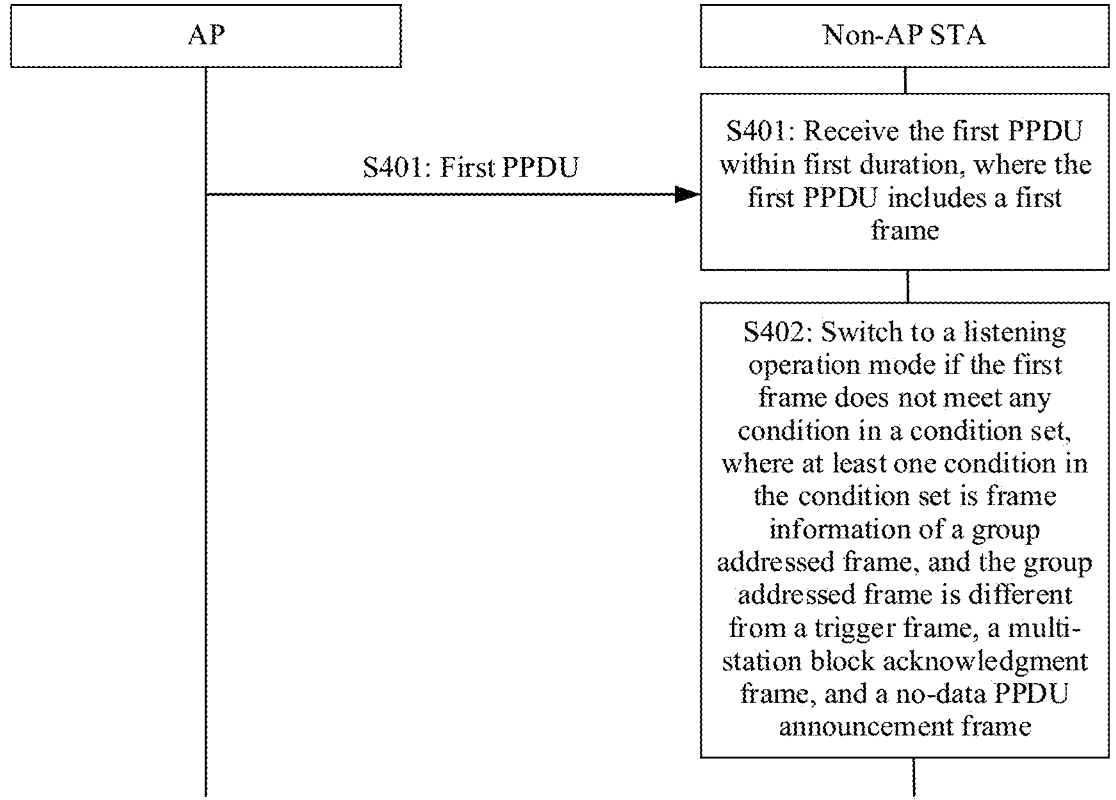
FIG. 4 is a schematic flowchart of an MLO communication method applicable to an embodiment of this disclosure.

FIG. 4 is a schematic flowchart of a communication method according to an embodiment.

S401: An AP sends a first PPDU. Correspondingly, a non-AP STA receives the first PPDU within first duration. The first PPDU includes a first frame.

For example, the first duration may be a preset duration starting from time at which the non-AP STA replies with a most recently received frame from the AP, or may be a preset duration starting from time at which the non-AP STA receives a most recently received frame that is from the AP and that does not require immediate acknowledgment from the non-AP STA. Preset duration=aSIFSTime+aSlotTime+aRxPHYStartDelay.

In a possible implementation, that the non-AP STA receives the first PPDU within the first duration may be implemented in the following manner: The non-AP STA receives a physical layer receiving start indication within the first duration, and detects the first PPDU when receiving a PPDU corresponding to the indication.

S402: The non-AP STA switches to a listening operation mode if the first frame does not meet all conditions in a condition set.

At least one condition in the condition set is frame information of a group addressed frame, and the group addressed frame is different from a trigger frame, a multi-station block acknowledgment frame, and a no-data PPDU announcement frame. In other words, the group addressed frame is different from (or is not) a currently defined trigger frame, multi-station block acknowledgment frame, or no-data PPDU announcement frame.

The following describes the at least one condition by using an example.

Example 1.1: The at least one condition may include at least one of the following conditions: a frame type is a broadcast frame, the broadcast frame is different from the trigger frame, the multi-station block acknowledgment frame, and the no-data PPDU announcement frame, and a transmitter address carried in the broadcast frame is an address of an AP affiliated with the non-AP STA (a broadcast frame with the TA equal to the MAC address of the AP affiliated with the AP MLD, except that the frame is a trigger frame (TF), a Multi-STA BlockAck frame, or an NDP Announcement frame); and the frame type is a group addressed frame, the group addressed frame is different from the broadcast frame, and a receiving device indicated by the group addressed frame includes the non-AP STA (a group addressed frame and the STA is a member of this group). That the group addressed frame is different from the broadcast frame may be understood as that a multicast address of the group addressed frame is not a broadcast address, or the group addressed frame is not a broadcast frame. That the group addressed frame is different from the broadcast frame described in the following may also be understood in this manner. Details are not further described one by one.

Example 1.2: The at least one condition may alternatively include at least one of the following conditions: a frame type is a broadcast frame, and a transmitter address carried in the broadcast frame is an address of an AP affiliated with the non-AP STA (a broadcast frame with the TA equal to the MAC address of the AP affiliated with the AP MLD); and the frame type is a group addressed frame, the group addressed frame is different from the broadcast frame, and a receiving device indicated by the group addressed frame includes the non-AP STA (a group addressed frame and the STA is a member of this group).

Example 1.3: The at least one condition may alternatively include at least one of the following conditions: a frame type is a broadcast frame, and a receiving device indicated by the broadcast frame includes the non-AP STA (a broadcast frame and the STA affiliated with the non-AP MLD is one of the target receiver of this broadcast frame); and the frame type is a group addressed frame, the group addressed frame is different from the broadcast frame, and a receiving device indicated by the group addressed frame includes the non-AP STA (a group addressed frame and the STA is a member of this group).

Optionally, in addition to the at least one condition, the condition set may further include at least one of the following five conditions: the frame type is an individually addressed frame, and a receiver address carried in the individually addressed frame is an address of the non-AP STA; the frame type is a trigger frame, the trigger frame includes a first field indicating user information, and the first field indicates the non-AP STA, for example, the first field may be a user information field; the frame type is a clear to send frame, and a receiver address carried in the clear to send frame is an address of an AP affiliated with the non-AP STA; the frame type is a multi-station block acknowledgment frame, the multi-station block acknowledgment frame includes a second field indicating station information, and the second field indicates the non-AP STA, for example, the second field may be Per AID TID Info; and the frame type is a no-data PPDU announcement frame, the no-data PPDU announcement frame includes a third field indicating the station information, and the third field indicates the non-AP STA, for example, the third field may be a STA information field.

For the foregoing five conditions, refer to related descriptions in the foregoing case 2. Details are not described herein again.

The following describes three specific examples of the condition set with reference to the foregoing description of the at least one condition.

Example 1.1: With reference to the foregoing example 1.1, the condition set may include the following conditions: the frame type is the broadcast frame, the broadcast frame is different from the trigger frame, the multi-station block acknowledgment frame, and the no-data PPDU announcement frame, and the transmitter address carried in the broadcast frame is the address of the AP affiliated with the non-AP STA; the frame type is the group addressed frame, the group addressed frame is different from the broadcast frame. In other words, the group addressed frame is not the broadcast frame, and the receiving device indicated by the group addressed frame includes the non-AP STA; the frame type is the individually addressed frame, and the receiver address carried in the individually addressed frame is the address of the non-AP STA; the frame type is the trigger frame, the trigger frame includes the first field indicating the user information, and the first field indicates the non-AP STA, for example, the first field may be the user information field; the frame type is the clear to send frame, and the receiver address carried in the clear to send frame is the address of the AP affiliated with the non-AP STA; the frame type is the multi-station block acknowledgment frame, the multi-station block acknowledgment frame includes the second field indicating the station information, and the second field indicates the non-AP STA, for example, the second field may be Per AID TID Info; and the frame type is the no-data PPDU announcement frame, the no-data PPDU announcement frame includes the third field indicating the station information, and the third field indicates the non-AP STA, for example, the third field may be the STA information field.

In this example, two conditions of the group addressed frame are added to the foregoing case 2, so that the non-AP STA can determine, when receiving a group addressed frame sent to the non-AP STA, whether to switch to the listening operation mode. For example, when the received group addressed frame does not meet all conditions in the condition set, the non-AP STA switches to the listening operation mode; or when the received group addressed frame meets any condition in the condition set, the non-AP STA does not switch to the listening operation mode. This can ensure that the group addressed frame and a subsequent frame can be received in time. In addition, based on the foregoing two conditions, the non-AP STA may switch to the listening operation mode in time when receiving a group addressed frame that is not sent to the non-AP STA. This can reduce a delay in communication with an AP on another link.

Example 1.2

With reference to the foregoing example 1.2, the condition set may include the following conditions: the frame type is the broadcast frame, and the transmitter address carried in the broadcast frame is the address of the AP affiliated with the non-AP STA; the frame type is the group addressed frame, the group addressed frame is different from the broadcast frame, and the receiving device indicated by the group addressed frame includes the non-AP STA; the frame type is the individually addressed frame, and the receiver address carried in the individually addressed frame is the address of the non-AP STA; and the frame type is the clear to send frame, and the receiver address carried in the clear to send frame is the address of the AP affiliated with the non-AP STA.

The foregoing conditions may cover the trigger frame, the multi-station block acknowledgment frame, the no-data PPDU announcement frame, and another group addressed frame, so that conditions of the trigger frame, the multi-station block acknowledgment frame, and the no-data PPDU announcement frame may not be separately listed in the condition set. This can simplify protocol description, and reduce implementation complexity. In addition, when receiving a group addressed frame sent to the non-AP STA, the non-AP STA may determine whether to switch to the listening operation mode. For example, when the received group addressed frame does not meet all conditions in the condition set, the non-AP STA switches to the listening operation mode; or when the received group addressed frame meets any condition in the condition set, the non-AP STA does not switch to the listening operation mode. This can improve flexibility, and can ensure that the group addressed frame and a subsequent frame can be received in time.

Example 1.3

With reference to the foregoing example 1.3, the condition set may include the following conditions: the frame type is the broadcast frame, and the receiving device indicated by the broadcast frame includes the non-AP STA; the frame type is the group addressed frame, the group addressed frame is different from the broadcast frame, and the receiving device indicated by the group addressed frame includes the non-AP STA; the frame type is the individually addressed frame, and the receiver address carried in the individually addressed frame is the address of the non-AP STA; and the frame type is the clear to send frame, and the receiver address carried in the clear to send frame is the address of the AP affiliated with the non-AP STA.

The foregoing conditions may cover the trigger frame, the multi-station block acknowledgment frame, the no-data PPDU announcement frame, and another group addressed frame, so that conditions of the trigger frame, the multi-station block acknowledgment frame, and the no-data PPDU announcement frame may not be separately listed in the condition set. This can simplify protocol description, and reduce implementation complexity. In addition, when receiving a group addressed frame sent to the non-AP STA, the non-AP STA may determine whether to switch to the listening operation mode. For example, when the received group addressed frame does not meet all conditions in the condition set, the non-AP STA switches to the listening operation mode; or when the received group addressed frame meets any condition in the condition set, the non-AP STA does not switch to the listening operation mode. This can improve flexibility, and can ensure that the group addressed frame and a subsequent frame can be received in time.

The foregoing describes a method for determining, by the non-AP STA based on the condition set, to switch to the listening operation mode. Optionally, the non-AP STA may further switch to the listening operation mode in the following scenario (or case or condition): receiving a second PPDU; and switching to the listening operation mode if a BSS indicated by the second PPDU is an inter-BSS (The STA affiliated with the non-AP MLD receives a PPDU and classifies the PPDU as inter-BSS PPDU). It should be noted that this manner may alternatively be implemented independently without depending on the method in Embodiment 1.

In a possible implementation, before step S402, if a BSS indicated by the first PPDU is an inter-BSS, switch to the listening operation mode. In this implementation, S402 may not be performed.

Some rules for switching to the listening operation mode are based on MAC layer information, and are carried in a data part. However, an inter-BSS PPDU may be determined by using a physical layer SIG field, the SIG field is before the data part in the PPDU. Therefore, in the foregoing manner, the non-AP STA switches to the listening operation mode when the inter-BSS PPDU is detected, and MAC content in the data part of the PPDU does not need to be further parsed, so that switching can be performed in time. This helps reduce a delay in communication with an AP on another link.

Optionally, the non-AP STA may alternatively switch to the listening operation mode in another scenario (or case or condition), for example, the foregoing case 1 or case 3. For details, refer to related descriptions in the foregoing background description. Details are not described herein again.

In this embodiment, a related condition of a group addressed frame other than the trigger frame, the multi-station block acknowledgment frame, and the no-data PPDU announcement frame is added to the condition set, so that the non-AP STA can determine, based on information about the group addressed frame when performing a switching operation, whether to switch to the listening operation mode. Compared with the technology in which the non-AP STA directly switches to the listening operation mode after the group addressed frame is received, in this embodiment of this application, after the group addressed frame is received, whether to switch to the listening operation mode can be determined based on information about the group addressed frame. For example, when the received group addressed frame does not meet all the conditions in the condition set, the non-AP STA switches to the listening operation mode; or when the received group addressed frame meets any condition in the condition set, the non-AP STA does not switch to the listening operation mode. This can improve flexibility, and can ensure that the group addressed frame and the subsequent frame can be received in time.

In addition, in Embodiment 1, switching rule logic in the current IEEE 802.11be standard document is still used, so that rationality and flexibility of the switching operation can be improved while protocol changes are reduced.

Embodiment 1 describes the technical solution of determining, based on whether the condition in the condition set is not met, whether to perform the switching operation, to ensure that the group addressed frame and the subsequent frame can be received in time. Embodiment 2 describes another method below. The method is a technical solution of determining, based on whether the condition in the condition set is met, whether to perform the switching operation, to ensure that the group addressed frame and the subsequent frame can be received in time.

Embodiment 2

FIG. 5 is a schematic flowchart of a communication method according to an embodiment.

S501: An AP sends a first PPDU. Correspondingly, a non-AP STA receives the first PPDU within first duration.

The first PPDU includes a first frame. For details, refer to related descriptions of S401 in the method shown in FIG. 4. Details are not described herein again.

S502: The non-AP STA switches to a listening operation mode if the first frame meets any condition in a condition set.

A frame type corresponding to at least one condition in the condition set includes a group addressed frame, and the group addressed frame is different from a trigger frame, a multi-station block acknowledgment frame, and a no-data physical layer protocol data unit PPDU announcement frame.

The following describes the at least one condition by using an example.

Example 2.1: The at least one condition may include at least one of the following conditions: a transmitter address in the frame is not an address of an AP affiliated with the non-AP STA (a frame with the TA that differs from the MAC address of the AP affiliated with the AP MLD); the frame type is a broadcast frame, and a target receiving device indicated by the broadcast frame does not include the non-AP STA (a broadcast frame but the STA affiliated with the non-AP MLD is not one of the target receiver STA). Optionally, the broadcast frame may be different from the trigger frame, the multi-station block acknowledgment frame, and the no-data PPDU announcement frame. In other words, the group addressed frame is different from (or is not) a currently defined trigger frame, multi-station block acknowledgment frame, or no-data PPDU announcement frame; and the frame type is a group addressed frame, the group addressed frame is different from the broadcast frame, and a receiving device indicated by the group addressed frame does not include the non-AP STA (a group addressed frame but the STA is not a member of this group), where that the group addressed frame is different from the broadcast frame may be understood as that a multicast address of the group addressed frame is not a broadcast address, or the group addressed frame is not a broadcast frame, that the group addressed frame is different from the broadcast frame may also be understood in this manner below, and details are not further described one by one.

Example 2.2: The at least one condition may include at least one of the following conditions: a transmitter address in the frame is not an address of an AP affiliated with the non-AP STA (a frame with the TA that differs from the MAC address of the AP affiliated with the AP MLD); and the frame type is a group addressed frame, the group addressed frame is different from a broadcast frame, and a receiving device indicated by the group addressed frame does not include the non-AP STA (a group addressed frame but the STA is not a member of this group).

Optionally, in addition to the at least one condition, the condition set may further include at least one of the following five conditions: the frame type is an individually addressed frame, a receiver address carried in the individually addressed frame is not an address of the non-AP STA (an individually addressed frame, addressed to another STA that is not affiliated with the non-AP MLD), and this condition may also be described as that the frame type is the individually addressed frame and the receiver address carried in the individually addressed frame indicates another non-AP STA; the frame type is a trigger frame, a first field included in the trigger frame does not indicate the non-AP STA, and the first field indicates user information (a Trigger frame that has none of the User Info fields addressed to the STA affiliated with the non-AP MLD), for example, the first field may be a user information field; the frame type is a clear to send frame, a receiver address carried in the clear to send frame is not the address of the AP affiliated with the non-AP STA (a CTS-to-self frame with the RA not equal to the MAC address of the AP affiliated with the AP MLD); the frame type is a multi-station block acknowledgment frame, a second field included in the multi-station block acknowledgment frame does not indicate the non-AP STA, and the second field indicates information about the non-AP STA (a Multi-STA BlockAck frame that has one none of the Per AID TID Info fields addressed to the STA affiliated with the non-AP MLD), for example, the second field may be Per AID TID Info; and the frame type is a no-data PPDU announcement frame, a third field included in the no-data PPDU announcement frame does not indicate the non-AP STA, and the third field indicates the information about the non-AP STA (an NDPA frame that has one none of the STA Info fields addressed to the STA affiliated with the non-AP MLD), for example, the third field may be a STA information field.

The following describes three specific examples of the condition set with reference to the foregoing description of the at least one condition.

Example 2.1

With reference to the foregoing example 2.1, the condition set may include the following conditions: the transmitter address in the frame is not the address of the AP affiliated with the non-AP STA; the frame type is the broadcast frame, the broadcast frame is different from the trigger frame, the multi-station block acknowledgment frame, and the no-data PPDU announcement frame, and the target receiving device indicated by the broadcast frame does not include the non-AP STA; the frame type is the group addressed frame, the group addressed frame is different from the broadcast frame, and the receiving device indicated by the group addressed frame does not include the non-AP STA; the frame type is the individually addressed frame, and the receiver address carried in the individually addressed frame is not the address of the non-AP STA; the frame type is the trigger frame, the first field included in the trigger frame does not indicate the non-AP STA, and the first field indicates the user information; the frame type is the clear to send frame, and the receiver address carried in the clear to send frame is not the address of the AP affiliated with the non-AP STA; the frame type is the multi-station block acknowledgment frame, the second field included in the multi-station block acknowledgment frame does not indicate the non-AP STA, and the second field indicates the information about the non-AP STA; and the frame type is the no-data PPDU announcement frame, the third field included in the no-data PPDU announcement frame does not indicate the non-AP STA, and the third field indicates the information about the non-AP STA.

In this example, a condition that may cover another group addressed frame is added, so that when receiving a group addressed frame sent to the non-AP STA, the non-AP STA can determine whether to switch to the listening operation mode. For example, when the received group addressed frame meets any condition in the condition set, the non-AP STA does not switch to the listening operation mode; or when the received group addressed frame does not meet all conditions in the condition set, the non-AP STA does not switch to the listening operation mode. This can ensure that the group addressed frame and a subsequent frame can be received in time.

Example 2.2

With reference to the foregoing example 2.2, the condition set may include the following conditions: a transmitter address in the frame is not the address of the AP affiliated with the non-AP STA; the frame type is the group addressed frame, the group addressed frame is different from the broadcast frame, and the receiving device indicated by the group addressed frame does not include the non-AP STA; the frame type is the individually addressed frame, and the receiver address carried in the individually addressed frame is not the address of the non-AP STA; and the frame type is the clear to send frame, and the receiver address carried in the clear to send frame is not the address of the AP affiliated with the non-AP STA.

The foregoing conditions may cover the trigger frame, the multi-station block acknowledgment frame, the no-data PPDU announcement frame, and another group addressed frame, so that conditions of the trigger frame, the multi-station block acknowledgment frame, and the no-data PPDU announcement frame may not be separately listed in the condition set. This can simplify protocol description, and reduce implementation complexity. In addition, when receiving a group addressed frame sent to the non-AP STA, the non-AP STA may determine whether to switch to the listening operation mode. For example, when the received group addressed frame meets any condition in the condition set, the non-AP STA does not switch to the listening operation mode; or when the received group addressed frame does not meet all conditions in the condition set, the non-AP STA switches to the listening operation mode. This can improve flexibility, and can ensure that the group addressed frame and a subsequent frame can be received in time.

Example 2.3

With reference to the foregoing example 2.2, the condition set may further include the following conditions: the transmitter address in the frame is not the address of the AP affiliated with the non-AP STA; the frame type is the group addressed frame, the group addressed frame is different from the broadcast frame, and the receiving device indicated by the group addressed frame does not include the non-AP STA; the frame type is the individually addressed frame, and the receiver address carried in the individually addressed frame is not the address of the non-AP STA; the frame type is the trigger frame, the first field included in the trigger frame does not indicate the non-AP STA, and the first field indicates the user information; the frame type is the clear to send frame, and the receiver address carried in the clear to send frame is not the address of the AP affiliated with the non-AP STA; the frame type is the multi-station block acknowledgment frame, the second field included in the multi-station block acknowledgment frame does not indicate the non-AP STA, and the second field indicates the information about the non-AP STA; and the frame type is the no-data PPDU announcement frame, the third field included in the no-data PPDU announcement frame does not indicate the non-AP STA, and the third field indicates the information about the non-AP STA.

In this example, when receiving the group addressed frame that meets any condition in the condition set, the non-AP STA may switch to the listening operation mode; or when receiving the group addressed frame that does not meet all conditions in the condition set, the non-AP STA does not switch to the listening operation mode. This can ensure that the group addressed frame and a subsequent frame can be received in time.

Example 2.4

With reference to the foregoing example 2.1, the condition set may include the following conditions: the transmitter address in the frame is not the address of the AP affiliated with the non-AP STA; the frame type is the broadcast frame, and the target receiving device indicated by the broadcast frame does not include the non-AP STA; the frame type is the group addressed frame, the group addressed frame is different from the broadcast frame, and the receiving device indicated by the group addressed frame does not include the non-AP STA; the frame type is the individually addressed frame, and the receiver address carried in the individually addressed frame is not the address of the non-AP STA; and the frame type is the clear to send frame, and the receiver address carried in the clear to send frame is not the address of the AP affiliated with the non-AP STA.

In this example, a condition that may cover another group addressed frame is added, so that when receiving a group addressed frame sent to the non-AP STA, the non-AP STA can determine whether to switch to the listening operation mode. This can ensure that the group addressed frame and a subsequent frame can be received in time.

The foregoing describes a method for determining, by the non-AP STA based on the condition set, to switch to the listening operation mode. Optionally, the non-AP STA may further switch to the listening operation mode in the following scenario (or case or condition): receiving a second PPDU; and switching to the listening operation mode if a BSS indicated by the second PPDU is an inter-BSS (The STA affiliated with the non-AP MLD receives a PPDU and classifies the PPDU as inter-BSS PPDU). It should be noted that this manner may alternatively be implemented independently without depending on the method in Embodiment 1.

In a possible implementation, before step S502, if it is determined that a BSS indicated by the first PPDU is an inter-BSS, it may be determined to switch to the listening operation mode. In this implementation, S502 may not be performed.

Some rules for switching to the listening operation mode are based on MAC layer information, and are carried in a data part. However, an inter-BSS PPDU may be determined by using a physical layer SIG field, the SIG field is before the data part in the PPDU. Therefore, in the foregoing manner, the non-AP STA switches to the listening operation mode when the inter-BSS PPDU is detected, and MAC content in the data part of the PPDU does not need to be further parsed, so that switching can be performed in time. This helps reduce a delay in communication with an AP on another link.

Optionally, the non-AP STA may further switch to the listening operation mode in another scenario (or case or condition), for example, the foregoing case 1 or case 3. For details, refer to related descriptions in the foregoing background description. Details are not described herein again.

In this embodiment, a condition that may cover a group addressed frame other than the trigger frame, the multi-station block acknowledgment frame, and the no-data PPDU announcement frame is added to the condition set, so that the non-AP STA can determine, based on information about the group addressed frame when performing a switching operation, whether to switch to the listening operation mode. Compared with some technology in which the non-AP STA directly switches to the listening operation mode after the group addressed frame is received, in this embodiment, after the group addressed frame is received, whether to switch to the listening operation mode can be determined based on the information about the group addressed frame. For example, when the received group addressed frame meets any condition in the condition set, the non-AP STA switches to the listening operation mode; or when the received group addressed frame does not meet all conditions in the condition set, the non-AP STA does not switch to the listening operation mode. This can improve flexibility, and ensure that the group addressed frame and a subsequent frame can be received in time, to improve rationality of the switching operation.

Embodiment 1 describes a technical solution of determining, based on whether the condition in the condition set is not met, whether to perform the switching operation, to ensure that the group addressed frame and the subsequent frame can be received in time. Embodiment 2 describes a technical solution of determining, based on whether the condition in the condition set is met, whether to perform the switching operation, to ensure that the group addressed frame and the subsequent frame can be received in time. Embodiment 3 describes another method. In the method, whether to switch to the listening operation mode is determined according to an SM PS-based switching rule and an EMLSR-based switching rule, to ensure that the group addressed frame and the subsequent frame can be received in time.

Embodiment 3

FIG. 6 is a schematic flowchart of a communication method according to an embodiment of this disclosure.

S601: A non-AP STA determines that any condition in a condition set is met.

The condition set includes the following condition, a group addressed frame is received, the group addressed frame is different from a broadcast frame, and a receiving device indicated by the group addressed frame does not include the non-AP STA (It receives a group addressed frame but the STA is not a member of this group).

In a possible implementation, the condition set may further include at least one of the following three conditions: a trigger frame is received, a first field included in the trigger frame does not indicate the non-AP STA, and the first field indicates user information, for example, the first field may be a user information field (It receives a Trigger frame that has none of the User Info fields addressed to it); a multi-station block acknowledgment frame is received, a second field included in the multi-station block acknowledgment frame does not indicate the non-AP STA, and the second field indicates information about the non-AP STA, for example, the second field may be Per AID TID Info (It receives a Multi-STA BlockAck frame that has none of the Per AID TID Info fields addressed to it); and a no-data PPDU announcement frame is received, a third field included in the no-data PPDU announcement frame does not indicate the non-AP STA, and the third field indicates the information about the non-AP STA, for example, the third field may be a STA information field (It receives an NDP Announcement frame that has none of the STA Info fields addressed to it).

In another possible implementation, the condition set may further include: a broadcast frame is received, and a target receiving device indicated by the broadcast frame does not include the non-AP STA (It receives a broadcast frame but the STA is not involved in the successive procedure).

The foregoing conditions are applicable to an EMLSR-based switching rule.

In addition to the foregoing conditions, the condition set may further include one of the following conditions: an individually addressed frame is received, and a destination address carried in the individually addressed frame is different from an address of the non-AP STA (It receives an individually addressed frame that is not a block ACK request (BAR), beamforming report poll (BFRP), and individual addressed TF such as multi-user BAR (MU-BAR), buffer status report poll (BSRP), and individual BFRP addressed to another STA); a frame is received, a transmitter address carried in the frame is different from a transmitter address carried in a frame that initiates a current transmission opportunity (It receives a frame with a TA that differs from the TA of the frame that started the TXOP. Some individually addressed control frames are exclusive such as BA and BFR); a frame is received, and a basic service set corresponding to the frame is different from a basic service set of a cell in which the non-AP STA is located (It receives a PPDU and classifies the PPDU as inter-BSS PPDU (see 26.2.2 (Intra-BSS and inter-BSS PPDU classification))); a multi-station block PPDU is received, the multi-station block PPDU is a high efficiency multi-station block PPDU or an extremely high throughput multi-station block PPDU, a basic service set indicated by the multi-station block PPDU is the same as the basic service set of the cell in which the non-AP STA is located, the multi-station block PPDU does not indicate that the non-AP STA is a receiving device, and a value of a basic service set disabled field carried in a high efficiency operation element last received by the non-AP STA is 0 (It receives an HE MU PPDU or EHT MU PPDU where the RXVECTOR parameter BSS_COLOR is the BSS color of the BSS in which the STA is associated, the RXVECTOR parameter does not have any STA_ID of an RU that identifies the STA as the recipient or one of the recipients of the RU (see 26.11.1 (STA_ID)), and the BSS Color Disabled subfield in the most recently received HE Operation element from the AP with which the STA is associated is 0); and a carrier sense mechanism indicates that a channel is continuously idle for preset duration (The CS mechanism (see 10.3.2.1 (CS mechanism)) indicates that the medium is idle at the TxPIFS slot boundary (defined in 10.3.7 (DCF timing relations))

The foregoing conditions are applicable to a station management (SM) power save (PS)-based switching rule. In the foregoing manner, the condition set includes both the SM PS-based switching rule and the EMLSR-based switching rule, so that the EMLSR-based rule and the SM PS-based rule are unified.

S602: The non-AP STA switches to a listening operation mode.

To facilitate understanding of this solution, the following describes three specific examples of the condition set.

Example 3.1: The condition set may include the following conditions: the individually addressed frame is received, and the destination address carried in the individually addressed frame is different from the address of the non-AP STA; the frame is received, and the transmitter address carried in the frame is different from the transmitter address carried in the frame that initiates the current transmission opportunity; the frame is received, and the basic service set corresponding to the frame is different from the basic service set of the cell in which the non-AP STA is located; the multi-station block PPDU is received, the multi-station block PPDU is the high efficiency multi-station block PPDU or the extremely high throughput multi-station block PPDU, the basic service set indicated by the multi-station block PPDU is the same as the basic service set of the cell in which the non-AP STA is located, the multi-station block PPDU does not indicate that the non-AP STA is the receiving device, and the value of the basic service set disabled field carried in the high efficiency operation element last received by the non-AP STA is 0; the group addressed frame is received, the group addressed frame is different from the broadcast frame, and the receiving device indicated by the group addressed frame does not include the non-AP STA; the trigger frame is received, the first field included in the trigger frame does not indicate the non-AP STA, and the first field indicates the user information; the multi-station block acknowledgment frame is received, the second field included in the multi-station block acknowledgment frame does not indicate the non-AP STA, and the second field indicates the information about the non-AP STA; the no-data PPDU announcement frame is received, the third field included in the no-data PPDU announcement frame does not indicate the non-AP STA, and the third field indicates the information about the non-AP STA; and the carrier sense mechanism indicates that the channel is continuously idle for preset duration.

Example 3.2: The condition set may include the following conditions: the individually addressed frame is received, and the destination address carried in the individually addressed frame is different from the address of the non-AP STA; the frame is received, and the transmitter address carried in the frame is different from the transmitter address carried in the frame that initiates the current transmission opportunity; the frame is received, and the basic service set corresponding to the frame is different from the basic service set of the cell in which the non-AP STA is located; the multi-station block PPDU is received, the multi-station block PPDU is the high efficiency multi-station block PPDU or the extremely high throughput multi-station block PPDU, the basic service set indicated by the multi-station block PPDU is the same as the basic service set of the cell in which the non-AP STA is located, the multi-station block PPDU does not indicate that the non-AP STA is the receiving device, and the value of the basic service set disabled field carried in the high efficiency operation element last received by the non-AP STA is 0; the group addressed frame is received, the group addressed frame is different from the broadcast frame, and the receiving device indicated by the group addressed frame does not include the non-AP STA; and the carrier sense mechanism indicates that the channel is continuously idle for preset duration.

Example 3.3: The condition set may include the following conditions: the individually addressed frame is received, and the destination address carried in the individually addressed frame is different from the address of the non-AP STA; the frame is received, and the transmitter address carried in the frame is different from the transmitter address carried in the frame that initiates the current transmission opportunity; the frame is received, and the basic service set corresponding to the frame is different from the basic service set of the cell in which the non-AP STA is located; the multi-station block PPDU is received, the multi-station block PPDU is the high efficiency multi-station block PPDU or the extremely high throughput multi-station block PPDU, the basic service set indicated by the multi-station block PPDU is the same as the basic service set of the cell in which the non-AP STA is located, the multi-station block PPDU does not indicate that the non-AP STA is the receiving device, and the value of the basic service set disabled field carried in the high efficiency operation element last received by the non-AP STA is 0; the group addressed frame is received, the group addressed frame is different from the broadcast frame, and the receiving device indicated by the group addressed frame does not include the non-AP STA; the broadcast frame is received, and the target receiving device indicated by the broadcast frame does not include the non-AP STA; and the carrier sense mechanism indicates that the channel is continuously idle for preset duration.

In the foregoing three examples, the first four conditions and the last condition in the condition set are applicable to the SM PS-based switching rule, and the remaining conditions are applicable to the EMLSR-based switching rule. In the foregoing manner, the condition set includes both the SM PS-based switching rule and the EMLSR-based switching rule, so that the EMLSR-based rule and the SM PS-based rule are unified.

In this embodiment, the SM PS-based switching rule is added to the EMLSR-based switching rule, or the EMLSR-based switching rule is added to the SM PS-based switching rule, so that the EMLSR-based rule and the SM PS-based rule are unified. In addition, a condition that may cover a group addressed frame other than the trigger frame, the multi-station block acknowledgment frame, and the no-data PPDU announcement frame is added to the EMLSR-based switching rule, so that the non-AP STA can determine, based on information about the group addressed frame when performing a switching operation, whether to switch to the listening operation mode. Compared with some other technology in which the non-AP STA directly switches to the listening operation mode after the group addressed frame is received, in this embodiment of this application, after the group addressed frame is received, the non-AP STA can determine, based on the information about the group addressed frame, not to switch to the listening operation mode. This can improve flexibility, and ensure that the group addressed frame and a subsequent frame can be received in time, to improve rationality of the switching operation.

The foregoing three embodiments cover a group addressed frame other than the trigger frame, the multi-station block acknowledgment frame, and the no-data PPDU announcement frame from a perspective of a switching rule, to ensure that the group addressed frame and the subsequent frame can be received in time. In embodiment 4, group addressed frames are centrally sent in a time period, and different switching rules are used in the time period and a time period for sending an individually addressed frame, to ensure that the group addressed frame and a subsequent frame can be received in time.

Embodiment 4

FIG. 7 is a schematic flowchart of a communication method according to an embodiment of this disclosure.

S701: A non-AP STA determines, in a first time period according to a first rule, whether to switch to a listening operation mode.

A start moment of the first time period is preset time or a receiving time of a first beacon frame, and the first time period is used to receive a group addressed frame. In an example for description, the receiving time of the first beacon frame may be time at which the first beacon frame is completed.

For example, the preset time may be pre-obtained sending time of the first beacon frame. For example, the non-AP STA may obtain the sending time of the first beacon frame by using a received frame, so that the non-AP STA can enter the first time period when the sending time arrives.

For example, the first beacon frame may be a delivery traffic indication map beacon frame.

Behavior of an AP in the first time period may be that only the group addressed frame is allowed to be sent.

In an optional solution, the AP may indicate, in each group addressed frame before a last group addressed frame in the first time period, that "transmission is not completed", and indicate, in the last group addressed frame in the first time period, that "transmission is completed". For example, the AP may set a more data (more data) field of the last group addressed frame in the first time period to a first value, and set a more data field of another group addressed frame in the first time period to a second value. The first value may be 0, and the second value may be 1. Alternatively, the first value may be 1, and the second value may be 0.

Correspondingly, behavior of the non-AP STA in the first time period may be that if "transmission is not completed" is indicated in the received group addressed frame, the non-AP STA continues to operate over this link, for example, continues to receive the group addressed frame on the link, or determines, according to the first rule, to switch to the listening operation mode.

That the non-AP STA determines, according to the first rule, whether to switch to the listening operation mode may be determined in the following manner, switching to the listening operation mode if any condition in a first condition set is met.

The first condition set includes at least one of the following: the group addressed frame indicating that transmission is completed is received; a timer expires, and start time of the timer is the start moment of the first time period; and a total length of a transmission opportunity, starting from the start moment of the first time period, of a first AP affiliated with the non-AP STA reaches preset duration.

S702: The non-AP STA determines, in a second time period according to a second rule, whether to switch to the listening operation mode, where a start moment of the second time period is receiving time of an initial control frame.

In an example for description, the receiving time of the initial control frame may be time at which the initial control frame is completed.

Behavior of the AP in the second time period may be that only an individually addressed frame is allowed to be sent, or both an individually addressed frame and a group addressed frame are allowed to be sent.

In a possible implementation, that the non-AP STA determines, according to the second rule, to switch to the listening operation mode may be, for example, determining, according to the method in Embodiment 1, to switch to the listening operation mode. For details, refer to related descriptions in the method shown in FIG. 4. Details are not described herein again.

In another possible implementation, that the non-AP STA determines, according to the second rule, to switch to the listening operation mode may be, for example, determining, according to the method in Embodiment 2, to switch to the listening operation mode. For details, refer to related descriptions in the method shown in FIG. 5. Details are not described herein again.

In still another possible implementation, that the non-AP STA determines, according to the second rule, to switch to the listening operation mode may be, for example, determining, according to the method in Embodiment 3, to switch to the listening operation mode. For details, refer to related descriptions in the method shown in FIG. 6. Details are not described herein again.

In yet another possible implementation, that the non-AP STA determines, according to the second rule, to switch to the listening operation mode may be, for example, the case 1 to the case 3 described.

In an optional solution, the initial control frame may indicate whether the AP sends a group addressed frame in the second time period.

In a possible implementation based on this solution, if the initial control frame indicates that the AP sends the group addressed frame in the second time period, the non-AP STA may determine, according to the method described in Embodiment 1, Embodiment 2, or Embodiment 3, to switch to the listening operation mode.

If the initial control frame indicates that the AP does not send the group addressed frame in the second time period, the non-AP STA may determine, according to a rule for switching to the listening operation mode in the current IEEE 802.11be standard document, to switch to the listening operation mode.

Figure 8:
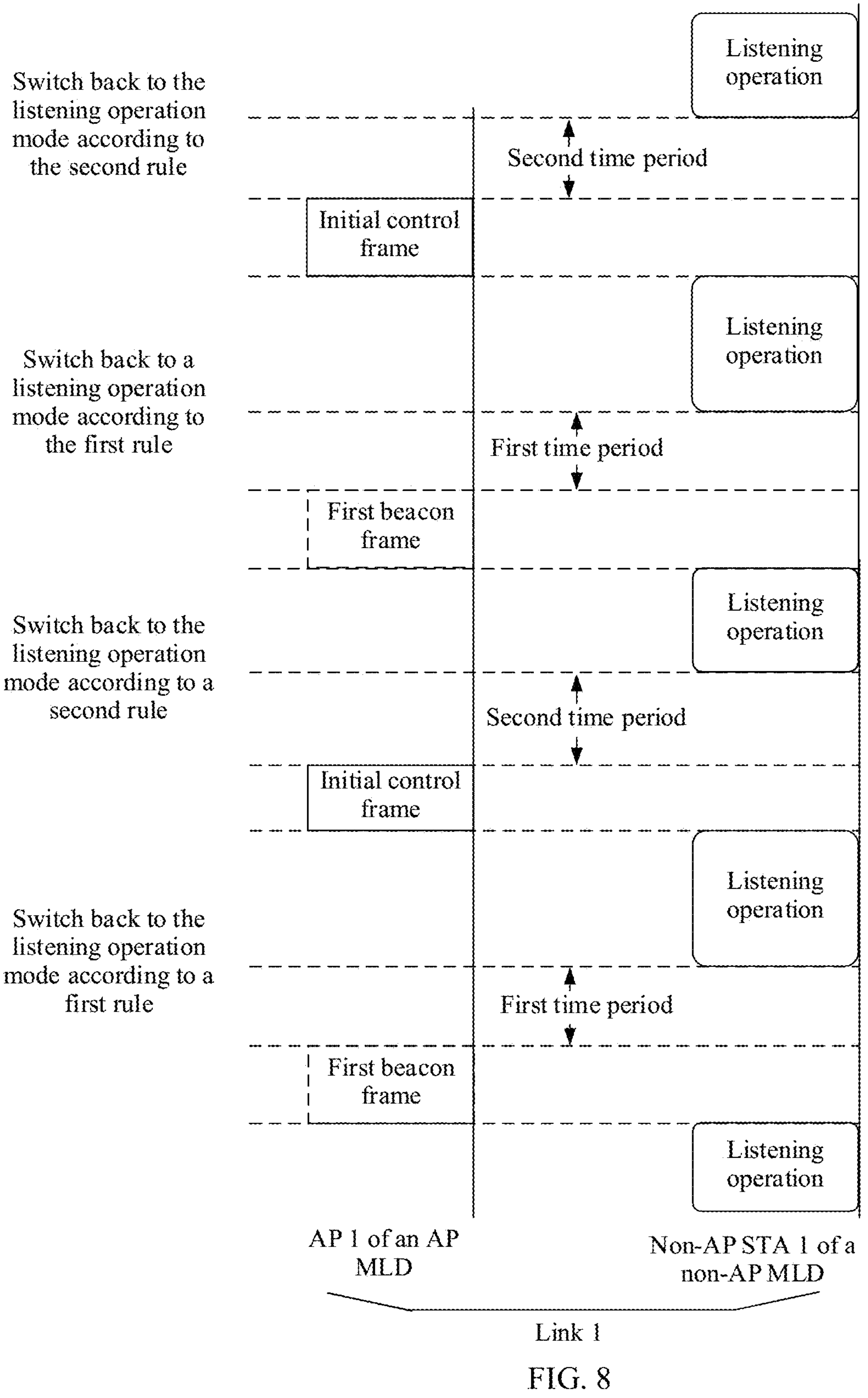
FIG. 8 is a schematic diagram of a first time period and a second time period applicable to an embodiment of this disclosure.

It should be noted that the first time period and the second time period are not subject to a sequence, and may be determined based on the preset time (or the receiving time of the first beacon frame) and the receiving time of the initial control frame. Optionally, the first time period and the second time period may appear alternately, as shown in FIG. 8.

Optionally, the AP may trigger, by using the first beacon frame, the non-AP STA to enter the first time period. The AP may also trigger, by using the initial control frame, the non-AP STA to enter the second time period.

In this embodiment, group addressed frames are centrally sent to the non-AP STA in a specific time period (namely, the first time period), and different switching rules are used in the time period and the second time period. This can ensure that the group addressed frame and a subsequent frame can be received in time, and can reduce a loss of a subsequent transmission opportunity.

Embodiment 1 to Embodiment 4 describe a method for switching to the listening operation mode from a perspective of the non-AP STA. In Embodiment 1 to Embodiment 4, the AP may trigger switching by sending some frames. For example, in Embodiment 1, the AP may trigger, by sending a frame that does not meet any condition in the condition set in Embodiment 1, the non-AP STA to switch to the listening operation mode. For another example, in Embodiment 2, the AP may trigger, by sending a frame that meets any condition in the condition set in Embodiment 2, the non-AP STA to switch to the listening operation mode. For another example, in Embodiment 3, the AP may trigger, by sending a frame that meets any condition in the condition set in Embodiment 3, the non-AP STA to switch to the listening operation mode. For another example, in Embodiment 4, the AP may trigger, by sending a frame that meets the first rule in Embodiment 4 and in the first time period, the non-AP STA to switch to the listening operation mode, and may trigger, by sending a frame that meets the second rule in Embodiment 4 and in the second time period, the non-AP STA to switch to the listening operation mode.

Figure 9:
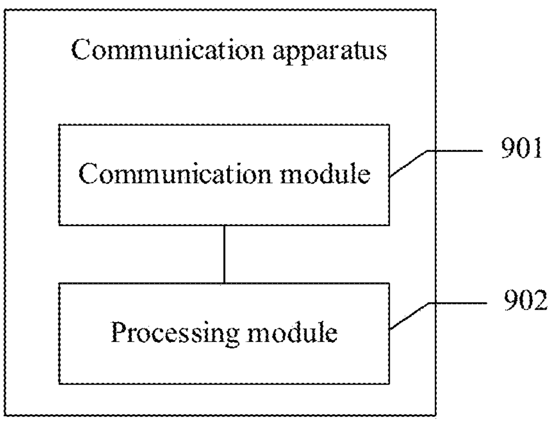
FIG. 9 is a schematic diagram of a structure of an MLO communication apparatus to which an embodiment of this disclosure is applicable.

Based on a same concept as the method embodiments, an embodiment provides a communication apparatus. A structure of the communication apparatus may be shown in FIG. 9. The communication apparatus includes a communication module 901 and a processing module 902.

In an implementation, the communication apparatus may be configured to implement the method performed by the non-AP STA in the embodiment shown in FIG. 4. The apparatus may be the non-AP STA, or may be a chip, a chipset, or a part of a chip, where the chip and the chipset are in the non-AP STA, and the part of the chip is configured to perform a function of a related method. The communication module 901 is configured to receive a first PPDU within first duration, where the first PPDU includes a first frame. The processing module 902 is configured to switch to a listening operation mode if the first frame does not meet any condition in a condition set, where at least one condition in the condition set is frame information of a group addressed frame, and the group addressed frame is different from a trigger frame, a multi-station block acknowledgment frame, and a no-data PPDU announcement frame.

For example, the at least one condition includes: a frame type is a group addressed frame, the group addressed frame is different from a broadcast frame, and a receiving device indicated by the group addressed frame includes the station.

For example, the at least one condition includes: a frame type is a broadcast frame, and a transmitter address carried in the broadcast frame is an address of an access point station affiliated with the station; or a frame type is a broadcast frame, and a receiving device indicated by the broadcast frame includes the station.

Optionally, the broadcast frame is different from the trigger frame, the multi-station block acknowledgment frame, and the no-data PPDU announcement frame.

For example, the condition set further includes at least one of the following five conditions: the frame type is an individually addressed frame, and a receiver address carried in the individually addressed frame is an address of the station; the frame type is a trigger frame, the trigger frame includes a first field indicating user information, and the first field indicates the station; the frame type is a clear to send frame, and a receiver address carried in the clear to send frame is the address of the access point station affiliated with the station; the frame type is a multi-station block acknowledgment frame, the multi-station block acknowledgment frame includes a second field indicating station information, and the second field indicates the station; and the frame type is a no-data PPDU announcement frame, the no-data PPDU announcement frame includes a third field indicating the station information, and the third field indicates the station.

Optionally, the communication module 901 is further configured to receive a PPDU; and the processing module 902 is further configured to switch to the listening operation if a basic service set indicated by the PPDU is an external basic service set.

In an implementation, the communication apparatus may be configured to implement the method performed by the non-AP STA in the embodiment shown in FIG. 5. The apparatus may be the non-AP STA, or may be a chip, a chipset, or a part of a chip, where the chip and the chipset are in the non-AP STA, and the part of the chip is configured to perform a function of a related method. The communication module 901 is configured to receive a first PPDU within first duration, where the first PPDU includes a first frame. The processing module is configured to switch to a listening operation mode if the first frame meets any condition in a condition set, where a frame type corresponding to at least one condition in the condition set includes a group addressed frame, and the group addressed frame is different from a trigger frame, a multi-station block acknowledgment frame, and a no-data PPDU announcement frame.

For example, the at least one condition includes at least one of the following three conditions: a transmitter address in the frame is not an address of an access point station affiliated with the station; the frame type is a broadcast frame, and a target receiving device indicated by the broadcast frame does not include the station; and the frame type is a group addressed frame, the group addressed frame is different from the broadcast frame, and a receiving device indicated by the group addressed frame does not include the station.

For example, the at least one condition includes at least one of the following two conditions: a transmitter address in the frame is not an address of an access point station affiliated with the station; and the frame type is a group addressed frame, the group addressed frame is different from a broadcast frame, and a receiving device indicated by the group addressed frame does not include the station.

For example, the condition set further includes at least one of the following five conditions: the frame type is an individually addressed frame, and a receiver address carried in the individually addressed frame is not an address of the station; the frame type is a trigger frame, a first field included in the trigger frame does not indicate the station, and the first field indicates user information; the frame type is a clear to send frame, and a receiver address carried in the clear to send frame is not the address of the access point station affiliated with the station; the frame type is a multi-station block acknowledgment frame, a second field included in the multi-station block acknowledgment frame does not indicate the station, and the second field indicates station information; and the frame type is a no-data PPDU announcement frame, a third field included in the no-data PPDU announcement frame does not indicate the station, and the third field indicates the station information.

Optionally, the communication module 901 is further configured to receive a PPDU; and the processing module 902 is further configured to switch to the listening operation if a basic service set indicated by the PPDU is an external basic service set.

In an implementation, the communication apparatus may be configured to implement the method performed by the non-AP STA in the embodiment shown in FIG. 6. The apparatus may be the non-AP STA, or may be a chip, a chipset, or a part of a chip, where the chip and the chipset are in the non-AP STA, and the part of the chip is configured to perform a function of a related method. The processing module 902 is configured to: determine that any condition in a condition set is met; and switch to a listening operation mode, where the condition set includes the following conditions: a group addressed frame is received, the group addressed frame is different from a broadcast frame, and a receiving device indicated by the group addressed frame does not include the station.

For example, the condition set further includes at least one of the following three conditions: a trigger frame is received, a first field included in the trigger frame does not indicate the station, and the first field indicates user information; a multi-station block acknowledgment frame is received, a second field included in the multi-station block acknowledgment frame does not indicate the station, and the second field indicates station information; and a no-data PPDU announcement frame is received, a third field included in the no-data PPDU announcement frame does not indicate the station, and the third field indicates the station information.

For example, the condition set includes the following conditions: the broadcast frame is received, and a target receiving device indicated by the broadcast frame does not include the station.

For example, the condition set further includes the following conditions: an extremely high throughput multi-station block PPDU is received, where a basic service set indicated by the extremely high throughput multi-station block PPDU is the same as a basic service set of a cell in which the station is located, the extremely high throughput multi-station block PPDU does not indicate that the station is a receiving device, and a value of a basic service set disabled field carried in a high efficiency operation element last received by the station is 0.

For example, the condition set further includes at least one of the following conditions: an individually addressed frame is received, and a destination address carried in the individually addressed frame is different from an address of the station; a frame is received, and a transmitter address carried in the frame is different from a transmitter address carried in a frame that initiates a current transmission opportunity; a frame is received, and a basic service set corresponding to the frame is different from the basic service set of the cell in which the station is located; a high efficiency multi-station block PPDU is received, a basic service set indicated by the high efficiency multi-station block PPDU is different from the basic service set of the cell in which the station is located, the high efficiency multi-station block PPDU does not indicate that the station is the receiving device, and the value of the basic service set disabled field carried in the high efficiency operation element last received by the station is 0; and the carrier sense mechanism indicates that a channel is continuously idle for preset duration.

In an implementation, the communication apparatus may be configured to implement the method performed by the non-AP STA in the embodiment shown in FIG. 7. The apparatus may be the non-AP STA, or may be a chip, a chipset, or a part of a chip, where the chip and the chipset are in the non-AP STA, and the part of the chip is configured to perform a function of a related method. The processing module 902 is configured to: determine, in a first time period according to a first rule, whether to switch to a listening operation mode, where a start moment of the first time period is preset time or receiving time of a first beacon frame, and the first time period is used to receive a group addressed frame; and determine, in a second time period according to a second rule, whether to switch to the listening operation mode, where a start moment of the second time period is receiving time of an initial control frame.

When determining, according to the first rule, whether to switch to the listening operation mode, the processing module 902 is configured to switch to the listening operation mode if any condition in a first condition set is met.

The first condition set includes at least one of the following: a group addressed frame indicating that transmission is completed is received; a timer expires, and start time of the timer is the start moment of the first time period; and a total length of a transmission opportunity, starting from the start moment of the first time period, of a first access point station affiliated with the station reaches preset duration.

For example, the first beacon frame is a delivery traffic indication map beacon frame.

Division into modules in this embodiment is an example, is merely logical function division, and may be other division during actual implementation. In addition, functional modules in embodiments may be integrated into one processor, or each of the modules may exist alone physically, or two or more modules may be integrated into one module. The integrated module may be implemented in a form of hardware, or may be implemented in a form of a software functional module. It may be understood that for functions or implementations of the modules in embodiments, further refer to related descriptions in the method embodiments.

Figure 10:
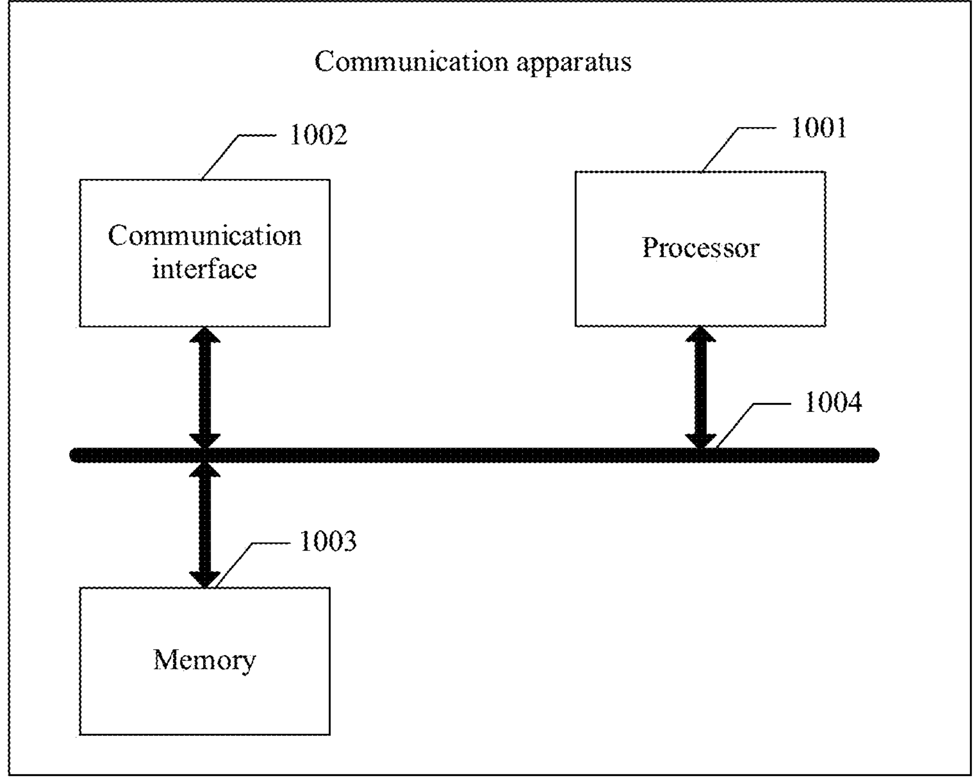
FIG. 10 is a schematic diagram of a structure of an MLO communication apparatus to which an embodiment of this disclosure is applicable.

In a possible implementation, the communication apparatus may be shown in FIG. 10. The apparatus may be a communication device or a chip in the communication device. The communication device may be the terminal device in the foregoing embodiment or the network device in the foregoing embodiment. The apparatus includes a processor 1001 and a communication interface 1002, and may further include a memory 1003. The processing module 902 may be the processor 1001. The communication module 901 may be the communication interface 1002. Optionally, the processor 1001 and the memory 1003 may be integrated together.

The processor 1001 may be a CPU, a digital processing module, or the like. The communication interface 1002 may be a transceiver, an interface circuit such as a transceiver circuit, a transceiver chip, or the like. The apparatus further includes the memory 1003, configured to store a program executed by the processor 1001. The memory 1003 may be a nonvolatile memory, for example, a hard disk drive (HDD) or a solid-state drive (SSD), or may be a volatile memory, for example, a random-access memory (RAM). The memory 1003 is any other medium that can be configured to carry or store expected program code in a form of an instruction or a data structure and that can be accessed by a computer. However, this is not limited thereto.

The processor 1001 is configured to execute the program code stored in the memory 1003, and is configured to execute an action of the processing module 902. Details are not described herein in this application. The communication interface 1002 is configured to perform an action of the communication module 901. Details are not described herein in this application.

A specific connection medium between the communication interface 1002, the processor 1001, and the memory 1003 is not limited in embodiments of this disclosure. In this embodiment of this application, the memory 1003, the processor 1001, and the communication interface 1002 are connected through a bus 1004 in FIG. 10. The bus is represented by using a thick line in FIG. 10. A manner of connection between other components is merely an example for description, and is not limited thereto. Buses may be classified into an address bus, a data bus, a control bus, and the like. For ease of representation, the bus is represented by using only one thick line in FIG. 10. However, this does not mean that there is only one bus or one type of bus.

An embodiment further provides a computer-readable storage medium, configured to store computer software instructions that need to be executed for execution of the foregoing processor, and the computer-readable storage medium includes a program that needs to be executed for execution of the foregoing processor.

An embodiment further provides a communication system, including a communication apparatus configured to implement a function of a transmitter in the embodiment in FIG. 4 and a communication apparatus configured to implement a function of a receiver in the embodiment in FIG. 4.

Persons skilled in the art should understand that embodiments of this disclosure may be provided as a method, a system, or a computer program product. Therefore, implementations of this disclosure may use a form of hardware only embodiments, software only embodiments, or embodiments with a combination of software and hardware. Moreover, embodiments may use a form of a computer program product that is implemented on one or more computer-usable storage media (including but not limited to a disk memory, a compact disc (CD) read-only memory (ROM) (CD-ROM), an optical memory, and the like) that include computer-usable program code.

This disclosure is described with reference to the flowcharts and/or block diagrams of the method, the device (system), and the computer program product according to example embodiments. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that, persons skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A multi-link-based communication method implemented in a non-access point station, the multi-link-based communication method comprising:

receiving a first physical layer protocol data unit (PPDU) within a first duration, wherein the first PPDU comprises a first frame; and switching to a listening operation mode when the first frame does not meet all conditions in a condition set, wherein at least one condition in the condition set is based on frame information of a group addressed frame, and wherein the group addressed frame is different from a trigger frame, a multi-station block acknowledgment frame, and a no-data PPDU announcement frame.

2. The multi-link-based communication method of claim 1, wherein the at least one condition comprises a condition that a frame type of the first frame is the group addressed frame, wherein the group addressed frame is different from a broadcast frame, and wherein the non-access point station is a receiving device indicated by the group addressed frame.

3. The multi-link-based communication method of claim 1, wherein the at least one condition comprises a frame type of the first frame is a broadcast frame, and wherein a transmitter address carried in the broadcast frame is of an access point affiliated with the non-access point station.

4. The multi-link-based communication method of claim 3, wherein the broadcast frame is different from the trigger frame, the multi-station block acknowledgment frame, and the no-data PPDU announcement frame.

5. The multi-link-based communication method of claim 2, wherein the condition set further comprises a condition that the frame type is an individually addressed frame comprising an address of the station.

6. The multi-link-based communication method of claim 1, further comprising:

receiving a second PPDU; and switching to the listening operation mode when the second PPDU indicates an external basic service set.

7. The multi-link-based communication method of claim 2, wherein the condition set further comprises a condition that the frame type is the trigger frame comprising a field comprising user information indicating the non-access point station.

8. The multi-link-based communication method of claim 2, wherein the condition set further comprises a condition that the frame type is a clear to send frame comprising a receiver address of an access point affiliated with the station.

9. The multi-link-based communication method of claim 2, wherein the condition set further comprises a condition that the frame type is the multi-station block acknowledgment frame comprising a field indicating the non-access point station.

10. The multi-link-based communication method of claim 2, wherein the condition set further comprises a condition that the frame type is the no-data PPDU announcement frame comprising a field indicating the non-access point station.

11. The multi-link-based communication method of claim 1, wherein the at least one condition comprises a condition that a frame type of the first frame is a broadcast frame, wherein the non-access point station is a receiving device indicated by the broadcast frame, and wherein the broadcast frame is different from the trigger frame, the multi-station block acknowledgment frame, and the no-data PPDU announcement frame.

12. A multi-link-based communication apparatus comprising:

a transmitter configured to receive a first physical layer protocol data unit (PPDU) within a first duration, wherein the first PPDU comprises a first frame; and a processor coupled to the transmitter and configured to switch the multi-link-based communication apparatus to a listening mode when the first frame does not meet all conditions in a condition set, wherein at least one condition in the condition set is frame information of a group addressed frame, and wherein the group addressed frame is different from a trigger frame, a multi-station block acknowledgment frame, and a no-data PPDU announcement frame.

13. The multi-link-based communication apparatus of claim 12, wherein the at least one condition comprises a condition that a frame type of the first frame is the group addressed frame, wherein the group addressed frame is different from a broadcast frame, and wherein the multi-link-based communication apparatus is a receiving device indicated by the group addressed frame.

14. The multi-link-based communication apparatus of claim 12, wherein the at least one condition comprises a condition that a frame type of the first frame is a broadcast frame, and wherein either a transmitter address carried in the broadcast frame is of an access point affiliated with the station or the multi-link-based communication apparatus is a receiving device indicated by the broadcast frame.

15. The multi-link-based communication apparatus of claim 14, wherein the broadcast frame is different from the trigger frame, the multi-station block acknowledgment frame, and the no-data PPDU announcement frame.

16. The multi-link-based communication apparatus of claim 13, wherein the condition set further comprises at least one of the following conditions:

the frame type is an individually addressed frame comprising an address of the multi-link-based communication apparatus;

the frame type is the trigger frame, wherein the trigger frame comprises a first field indicating the multi-link-based communication apparatus;

the frame type is a clear to send frame comprising a receiver address of an access point affiliated with the multi-link-based communication apparatus;

the frame type is the multi-station block acknowledgment frame, wherein the multi-station block acknowledgment frame comprises a second field indicating multi-link-based communication apparatus; or the frame type is the no-data PPDU announcement frame, wherein the no-data PPDU announcement frame comprises a third field indicating the multi-link-based communication apparatus.

17. The multi-link-based communication apparatus of claim 12, wherein the transmitter is further configured to receive a second PPDU, and wherein the processor is further configured to switch to the listening mode when the second PPDU indicates an external basic service set.

18. A multi-link-based communication a station comprising:

a transceiver configured to;

receive a first beacon frame;

receive, during a first time period, a group addressed frame, wherein a first start moment of the first time period is a first receiving time of the first beacon frame; and receive, during a second time period, an initial control frame, wherein a second start moment of the second time period is a second receiving time of the initial control frame; and a processor coupled to the transceiver and configured to:

switch, during the first time period and according to a first rule, to a listening mode; and switch, during the second time period and according to a second rule, to the listening mode.

19. The multi-link-based communication station of claim 18, wherein the processor is further configured to switch to the listening mode when one of the following conditions is met:

a group addressed frame indicating that transmission is completed is received;

a timer expires, and a start time of the timer is the first start moment; and a total length of a transmission opportunity, starting from the first start moment, of a first access point affiliated with the station reaches a preset duration.

20. The multi-link-based communication station of claim 18, wherein the first beacon frame is a delivery traffic indication map beacon frame.

* * * * *